(12) United States Patent
Turlik et al.

(10) Patent No.: US 12,242,403 B2
(45) Date of Patent: Mar. 4, 2025

(54) DIRECT ACCESS TO RECONFIGURABLE PROCESSOR MEMORY

(71) Applicant: SambaNova Systems, Inc., Palo Alto, CA (US)

(72) Inventors: Conrad Alexander Turlik, Palo Alto, CA (US); Sudhakar Dindukurti, Palo Alto, CA (US); Anand Misra, Palo Alto, CA (US); Arjun Sabnis, Palo Alto, CA (US); Milad Sharif, Palo Alto, CA (US); Ravinder Kumar, Palo Alto, CA (US); Joshua Earle Polzin, Palo Alto, CA (US); Arnav Goel, Palo Alto, CA (US); Steven Dai, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 18/121,224

(22) Filed: Mar. 14, 2023

(65) Prior Publication Data
US 2023/0297527 A1     Sep. 21, 2023

Related U.S. Application Data

(60) Provisional application No. 63/321,654, filed on Mar. 18, 2022.

(51) Int. Cl.
*G06F 13/28*     (2006.01)

(52) U.S. Cl.
CPC ...... *G06F 13/28* (2013.01); *G06F 2213/3808* (2013.01)

(58) Field of Classification Search
CPC .............................. G06F 13/28; G06F 13/1673
(Continued)

(56) References Cited

U.S. PATENT DOCUMENTS 9,009,723 B2 * 4/2015 Degenaro ............... H04L 49/70
                                                 712/35
9,501,325 B2 * 11/2016 Pell ....................... G06F 9/3877
(Continued)

FOREIGN PATENT DOCUMENTS

TW       200736953 A    10/2007
WO    2010142987 A1    12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Titus Wong
(74) *Attorney, Agent, or Firm* — Flagship Patents; Sikander M. Khan; Joachim Erhard Pistorius

(57) ABSTRACT

A system is presented that includes two data processing systems that are coupled via a network, each data processing system including a reconfigurable processor with a reconfigurable processor memory, a host that is coupled to the reconfigurable processor and that includes a host processor and a host memory that is coupled to the host processor, and a network interface controller (NIC) that is operatively coupled to the reconfigurable processor and to the host processor. The reconfigurable processor of one of the data processing systems is configured to implement a virtual function that uses a virtual address for a memory access operation. An application programming interface (API) in the host processor translates the virtual address into a physical address, and the NIC uses the physical address to initiate a direct memory access operation at the reconfigurable processor memory or the host memory of the other data processing system.

14 Claims, 13 Drawing Sheets

(58) Field of Classification Search
USPC .......................................................... 710/22
See application file for complete search history.

(56) References Cited

U.S. PATENT DOCUMENTS

| | | | |
|---|---|---|---|
| 10,698,853 | B1 | 6/2020 | Grohoski et al. |
| 11,182,221 | B1* | 11/2021 | Sivaramakrishnan .. G06F 30/34 |
| 11,237,880 | B1* | 2/2022 | Raumann ................. G06F 9/544 |
| 2014/0201642 | A1 | 7/2014 | Vicat-Blanc |
| 2015/0100971 | A1* | 4/2015 | Dube ........................ G06F 9/54 |
| | | | 719/319 |
| 2016/0134702 | A1 | 5/2016 | Gertner |
| 2017/0317678 | A1 | 11/2017 | Coole et al. |
| 2018/0293185 | A1 | 10/2018 | Vembu et al. |
| 2019/0197655 | A1 | 6/2019 | Sun et al. |
| 2019/0384642 | A1* | 12/2019 | Bolkhovitin ............ G06F 3/067 |
| 2020/0174840 | A1* | 6/2020 | Zhao ...................... G06F 9/5011 |
| 2020/0225996 | A1 | 7/2020 | Sharma et al. |
| 2020/0310994 | A1 | 10/2020 | Chofleming et al. |
| 2020/0326992 | A1* | 10/2020 | Jin .......................... G06F 9/5083 |
| 2021/0089343 | A1* | 3/2021 | Hyoudou ............... G06F 9/5016 |
| 2021/0263853 | A1 | 8/2021 | Waters et al. |
| 2021/0265015 | A1 | 8/2021 | Parnaby et al. |
| 2022/0058034 | A1* | 2/2022 | Grohoski ............ G06F 9/44505 |
| 2022/0100680 | A1 | 3/2022 | Chrysos et al. |
| 2022/0188028 | A1 | 6/2022 | Mesnier et al. |
| 2022/0197712 | A1* | 6/2022 | Sivaramakrishnan .. G06F 30/34 |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

TW 110124802—First Office Action and Search Report dated May 24, 2022, 17 pages.

U.S. Appl. No. 16/922,975—Final Office Action, dated Mar. 9, 2023, 23 pages.

U.S. Appl. No. 16/922,975—Non-Final Office Action, dated Oct. 27, 2022, 26 pages.

List of Related Cases for U.S. Appl. No. 18/121,224, filed Mar. 14, 2023, 2 pages.

* cited by examiner

DIRECT ACCESS TO RECONFIGURABLE PROCESSOR MEMORY

RELATED APPLICATIONS AND DOCUMENTS

This application claims the benefit of U.S. Provisional Patent Application No. 63/321,654, entitled, "Direct Access to Reconfigurable Processor Memory" filed on 18 Mar. 2022. The provisional application is hereby incorporated by reference for all purposes.

This application also is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- U.S. Nonprovisional patent application Ser. No. 16/239,252, now U.S. Pat. No. 10,698,853 B1, filed Jan. 3, 2019, entitled "VIRTUALIZATION OF A RECONFIGURABLE DATA PROCESSOR;"
- U.S. Nonprovisional patent application Ser. No. 16/862,445, now U.S. Pat. No. 11,188,497 B2, filed Apr. 29, 2020, entitled "VIRTUALIZATION OF A RECONFIGURABLE DATA PROCESSOR;"
- U.S. Nonprovisional patent application Ser. No. 16/197,826, now U.S. Pat. No. 10,831,507 B2, filed Nov. 21, 2018, entitled "CONFIGURATION LOAD OF A RECONFIGURABLE DATA PROCESSOR;"
- U.S. Nonprovisional patent application Ser. No. 16/198,086, now U.S. Pat. No. 11,188,497 B2, filed Nov. 21, 2018, entitled "CONFIGURATION UNLOAD OF A RECONFIGURABLE DATA PROCESSOR;"
- U.S. Nonprovisional patent application Ser. No. 17/093,543, filed Nov. 9, 2020, entitled "EFFICIENT CONFIGURATION OF A RECONFIGURABLE DATA PROCESSOR;"
- U.S. Nonprovisional patent application Ser. No. 16/260,548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"
- U.S. Nonprovisional patent application Ser. No. 16/536,192, now U.S. Pat. No. 11,080,227 B2, filed Aug. 8, 2019, entitled "COMPILER FLOW LOGIC FOR RECONFIGURABLE ARCHITECTURES;"
- U.S. Nonprovisional patent application Ser. No. 17/326,128, filed May 20, 2021, entitled "COMPILER FLOW LOGIC FOR RECONFIGURABLE ARCHITECTURES;"
- U.S. Nonprovisional patent application Ser. No. 16/407,675, now U.S. Pat. No. 11,386,038 B2, filed May 9, 2019, entitled "CONTROL FLOW BARRIER AND RECONFIGURABLE DATA PROCESSOR;"
- U.S. Nonprovisional patent application Ser. No. 16/504,627, now U.S. Pat. No. 11,055,141 B2, filed Jul. 8, 2019, entitled "QUIESCE RECONFIGURABLE DATA PROCESSOR;"
- U.S. Nonprovisional patent application Ser. No. 17/322,697, filed May 17, 2021, entitled "QUIESCE RECONFIGURABLE DATA PROCESSOR;"
- U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION;"
- U.S. Nonprovisional patent application Ser. No. 16/744,077, filed Jan. 15, 2020, entitled "COMPUTATIONALLY EFFICIENT SOFTMAX LOSS GRADIENT BACKPROPAGATION;"
- U.S. Nonprovisional patent application Ser. No. 16/590,058, now U.S. Pat. No. 11,327,713 B2, filed Oct. 1, 2019, entitled "COMPUTATION UNITS FOR FUNCTIONS BASED ON LOOKUP TABLES;"
- U.S. Nonprovisional patent application Ser. No. 16/695,138, now U.S. Pat. No. 11,328,038 B2, filed Nov. 25, 2019, entitled "COMPUTATIONAL UNITS FOR BATCH NORMALIZATION;"
- U.S. Nonprovisional patent application Ser. No. 16/688,069, filed Nov. 19, 2019, now U.S. Pat. No. 11,327,717 B2, entitled "LOOK-UP TABLE WITH INPUT OFFSETTING;"
- U.S. Nonprovisional patent application Ser. No. 16/718,094, filed Dec. 17, 2019, now U.S. Pat. No. 11,150,872 B2, entitled "COMPUTATIONAL UNITS FOR ELEMENT APPROXIMATION;"
- U.S. Nonprovisional patent application Ser. No. 16/560,057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"
- U.S. Nonprovisional patent application Ser. No. 16/572,527, now U.S. Pat. No. 11,410,027 B2, filed Sep. 16, 2019, entitled "Performance Estimation-Based Resource Allocation for Reconfigurable Architectures;"
- U.S. Nonprovisional patent application Ser. No. 15/930,381, now U.S. Pat. No. 11,250,105 B2, filed May 12, 2020, entitled "COMPUTATIONALLY EFFICIENT GENERAL MATRIX-MATRIX MULTIPLICATION (GEMM);"
- U.S. Nonprovisional patent application Ser. No. 17/337,080, now U.S. Pat. No. 11,328,209 B1, filed Jun. 2, 2021, entitled "MEMORY EFFICIENT DROPOUT;"
- U.S. Nonprovisional patent application Ser. No. 17/337,126, now U.S. Pat. No. 11,256,987 B1, filed Jun. 2, 2021, entitled "MEMORY EFFICIENT DROPOUT, WITH REORDERING OF DROPOUT MASK ELEMENTS;"
- U.S. Nonprovisional patent application Ser. No. 16/890,841, filed Jun. 2, 2020, entitled "ANTI-CONGESTION FLOW CONTROL FOR RECONFIGURABLE PROCESSORS;"
- U.S. Nonprovisional patent application Ser. No. 17/023,015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"
- U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION;"
- U.S. Nonprovisional patent application Ser. No. 17/175,289, now U.S. Pat. No. 11,126,574 B1, filed Feb. 12, 2021, entitled "INSTRUMENTATION PROFILING FOR RECONFIGURABLE PROCESSORS;"
- U.S. Nonprovisional patent application Ser. No. 17/371,049, filed Jul. 8, 2021, entitled "SYSTEMS AND

METHODS FOR EDITING TOPOLOGY OF A RECONFIGURABLE DATA PROCESSOR;"

U.S. Nonprovisional patent application Ser. No. 16/922,975, filed Jul. 7, 2020, entitled "RUNTIME VIRTUALIZATION OF RECONFIGURABLE DATA FLOW RESOURCES;"

U.S. Nonprovisional patent application Ser. No. 16/996,666, filed Aug. 18, 2020, entitled "RUNTIME PATCHING OF CONFIGURATION FILES;"

U.S. Nonprovisional patent application Ser. No. 17/214,768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127,818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127,929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185,264, filed Feb. 25, 2021, entitled "TIME-MULTIPLEXED USE OF RECONFIGURABLE HARDWARE;"

U.S. Nonprovisional patent application Ser. No. 17/216,647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216,650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216,657, now U.S. Pat. No. 11,263,170 B1, filed Mar. 29, 2021, entitled "LOSSLESS TILING IN CONVOLUTION NETWORKS—PADDING BEFORE TILING, LOCATION-BASED TILING, AND ZEROING-OUT;"

U.S. Nonprovisional patent application Ser. No. 17/384,515, filed Jul. 23, 2021, entitled "LOSSLESS TILING IN CONVOLUTION NETWORKS—MATERIALIZATION OF TENSORS;"

U.S. Nonprovisional patent application Ser. No. 17/216,651, now U.S. Pat. No. 11,195,080 B1, filed Mar. 29, 2021, entitled "LOSSLESS TILING IN CONVOLUTION NETWORKS—TILING CONFIGURATION;"

U.S. Nonprovisional patent application Ser. No. 17/216,652, now U.S. Pat. No. 11,227,207 B1, filed Mar. 29, 2021, entitled "LOSSLESS TILING IN CONVOLUTION NETWORKS—SECTION BOUNDARIES;"

U.S. Nonprovisional patent application Ser. No. 17/216,654, now U.S. Pat. No. 11,250,061 B1, filed Mar. 29, 2021, entitled "LOSSLESS TILING IN CONVOLUTION NETWORKS—READ-MODIFY-WRITE IN BACKWARD PASS;"

U.S. Nonprovisional patent application Ser. No. 17/216,655, now U.S. Pat. No. 11,232,360 B1, filed Mar. 29, 2021, entitled "LOSSLESS TILING IN CONVOLUTION NETWORKS—WEIGHT GRADIENT CALCULATION;"

U.S. Nonprovisional patent application Ser. No. 17/364,110, filed Jun. 30, 2021, entitled "LOSSLESS TILING IN CONVOLUTION NETWORKS—TILING CONFIGURATION FOR A SEQUENCE OF SECTIONS OF A GRAPH;"

U.S. Nonprovisional patent application Ser. No. 17/364,129, filed Jun. 30, 2021, entitled "LOSSLESS TILING IN CONVOLUTION NETWORKS—TILING CONFIGURATION BETWEEN TWO SECTIONS;"

"U.S. Nonprovisional patent application Ser. No. 17/364,141, filed Jun. 30, 2021, entitled "LOSSLESS TILING IN CONVOLUTION NETWORKS—PADDING AND RE-TILING AT SECTION BOUNDARIES;"

U.S. Nonprovisional patent application Ser. No. 17/384,507, filed Jul. 23, 2021, entitled "LOSSLESS TILING IN CONVOLUTION NETWORKS— BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/190,749, filed May 19, 2021, entitled "FLOATING POINT MULTIPLY-ADD, ACCUMULATE UNIT WITH CARRY-SAVE ACCUMULATOR;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397,241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216,509, now U.S. Pat. No. 11,191,182 B1, filed Mar. 29, 2021, entitled "UNIVERSAL RAIL KIT;"

U.S. Nonprovisional patent application Ser. No. 17/379,921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379,924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378,342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378,391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378,399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;"

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338,620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338,625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338,626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338,629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405,913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a system, and more particularly, to a system with two data processing systems that are coupled by a network, whereby each one of the data processing systems includes a host with a host processor and a host memory, a reconfigurable processor with a reconfigurable processor memory, and a network interface controller (NIC) that is operatively coupled to the reconfigurable processor and the host. The reconfigurable processor in one of the data processing systems is configured to implement a virtual function that uses a virtual address for a memory access operation. The host processor in this data processing system is configured to implement an application programming interface (API) that translates the virtual address into a physical address, and the NIC in this data processing system uses the physical address to initiate a direct memory access operation at the host memory or the reconfigurable processor memory of the other data processing system that moves data directly between the reconfigurable processor and the host memory or the reconfigurable processor memory in the other data processing system.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including FPGAs, can be configured to implement a variety of functions more efficiently or faster than might be achieved using a general-purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

Such reconfigurable processors, and especially CGRAs, often include specialized hardware elements such as computing resources and device memory that operate in conjunction with one or more software elements such as a CPU and attached host memory in deep learning applications.

Deep learning is a subset of machine learning algorithms that are inspired by the structure and function of the human brain. Most deep learning algorithms involve artificial neural network architectures, in which multiple layers of neurons each receive input from neurons in a prior layer or layers, and in turn influence the neurons in the subsequent layer or layers.

Training a neural network involves determining weights that are associated with the neural network, and making inference involves using a trained neural network to compute results by processing input data based on weights associated with the trained neural network.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
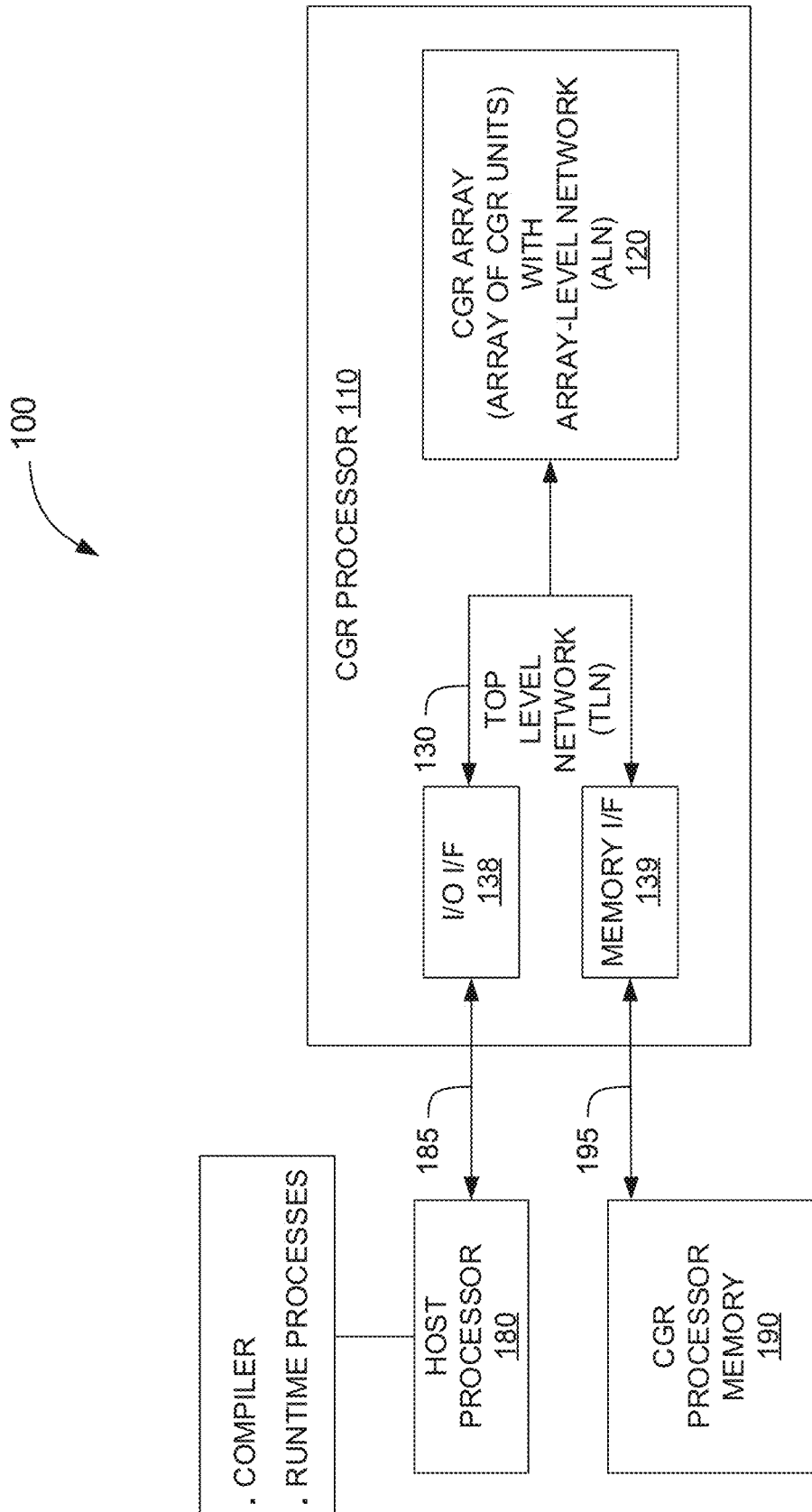
FIG. 1 is a diagram of an illustrative data processing system including a coarse-grained reconfigurable (CGR) processor, CGR processor memory, and a host processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are adapted for parallel processing, such as coarse-grained reconfigurable architectures (CGRAs) or graphic processing units (GPUs).

Reconfigurable processors, and especially CGRAs, often include specialized hardware elements such as computing and memory units that operate in conjunction with one or more software elements such as a host processor and attached host memory to train a neural network for a machine learning or artificial intelligence application and/or to make inference with the neural network.

Training these neural network models can be computationally extremely demanding. The computations involved in neural network training often include lengthy sequences that are highly repetitive, and that do not depend on the internal results from other instances of the sequence. Such computations often can be parallelized by running different instances of the sequence on different machines. Typically, the algorithms share partial results periodically among the instances, so periodic sync-ups occur as the algorithm proceeds.

Mechanisms for parallelizing neural network training can be divided roughly into two groups: model parallelism and data parallelism. In practice, parallelization mechanisms are sometimes mixed and matched, using a combination of model parallelism and data parallelism.

With model parallelism, the network model is divided up and parts of it are allocated to different data processing systems, which are sometimes also referred to as "nodes", "worker nodes", or "machines". In some versions the model is divided longitudinally, such that upstream portions of the model are executed by one data processing system, which passes its results to another data processing system that executes downstream portions of the model. In the meantime, the upstream data processing system can begin processing the next batch of training data through the upstream portions of the model. In other versions of model parallelism, the model may include branches which are later merged downstream. In such versions the different branches could be processed on different data processing systems.

With data parallelism, different instances of the same network model are programmed into different data processing systems. The different instances typically each process different batches of the training data, and the partial results are combined. In particular, parallelizing deep learning applications, especially those based on Stochastic Gradient Decent (SGD), requires periodic sharing of intermediate results among the various nodes operating in parallel. For data parallelization, such intermediate results can include both partially aggregated gradients being shared with those of other worker nodes in order to enable calculation of the fully aggregated gradients, and fully aggregated gradients or updated neural network parameters being returned to the worker nodes.

Traditionally, intermediate results are locally stored in device memory, and the sharing of the intermediate results between different nodes occurs in two operations. In a first operation, the data is moved from the device memory of a first node to the host memory of the first node, and, in a second operation, the data is moved from the host memory of the first node to the host memory of other nodes and from there to the device memory of the other nodes.

It is desirable therefore to provide a new approach of moving the data between the device memory in one node and the other nodes. The new approach should bypass the host processor and the host memory and allow for virtualization of applications operating on the respective nodes.

The new approach should save latency and bandwidth requirements and result in less CPU resource utilization.

A system with two data processing systems is described in which a reconfigurable processor in a first to the two data processing systems has direct access to host memory or reconfigurable processor memory in a second of the two data processing system. The system is well-suited for applications like machine-learning (ML) and training of neural networks. Each one of the two data processing systems includes a reconfigurable processor. If desired, each one of the two data processing systems includes more than one reconfigurable processor. In some implementations, the reconfigurable processor includes arrays of coarse-grained reconfigurable (CGR) units, which are sometimes also referred to as CGR arrays.

The architecture, configurability, and data flow capabilities of an array of coarse-grained reconfigurable (CGR) units enable increased compute power that supports both parallel and pipelined computation. A CGR processor, which includes one or more CGR arrays (arrays of CGR units), can be programmed to simultaneously execute multiple independent and interdependent data flow graphs. To enable simultaneous execution, the data flow graphs may be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or data flow graphs). This requirement implies that a compiler for a CGRA must decide which operation of a computation graph or data flow graph is assigned to which of the CGR units, and how both data and, related to the support of data flow graphs, control information flows among CGR units, and to and from host processor(s) and attached CGR processor memory.

FIG. 1 illustrates an example data processing system 100 including a CGR processor 110, a host processor 180, and an attached CGR processor memory 190. As shown, CGR processor 110 has a coarse-grained reconfigurable architecture (CGRA) and includes an array of CGR units 120 such as a CGR array. CGR processor 110 may include an input-output (I/O) interface 138 and a memory interface 139. Array of CGR units 120 may be coupled with (I/O) interface 138 and memory interface 139 via databus 130 which may be part of a top-level network (TLN). Host processor 180 communicates with I/O interface 138 via system databus 185, which may be a local bus as described hereinafter, and memory interface 139 communicates with attached CGR processor memory 190 via memory bus 195.

Array of CGR units 120 may further include compute units and memory units that are interconnected with an array-level network (ALN) to provide the circuitry for execution of a computation graph or a data flow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

In some implementations, execution of the graph(s) may involve using more than one CGR processor 110. In some implementations, CGR processor 110 may include one or more arrays of CGR units 120.

Host processor 180 may be, or include, a computer such as further described with reference to FIG. 2. Host processor 180 runs runtime processes, as further referenced herein. Therefore, host processor 180 or portions of host processor 180 are sometimes also referred to as a runtime processor. In some implementations, host processor 180 may also be used to run computer programs, such as the compiler further described herein with reference to FIG. 6. In some implementations, the compiler may run on a computer that is similar to the computer described with reference to FIG. 2, but separate from host processor 180.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file. In some implementations described herein, a CGR array 120 is configured by programming one or more configuration stores with all or parts of the configuration file. Therefore, the configuration file is sometimes also referred to as a programming file.

A single configuration store may be at the level of the CGR processor 110 or the CGR array 120, or a CGR unit may include an individual configuration store. The configuration file may include configuration data for the CGR array and CGR units in the CGR array, and link the computation graph to the CGR array. Execution of the configuration file by CGR processor 110 causes the CGR array (s) to implement the user algorithms and functions in the data flow graph.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
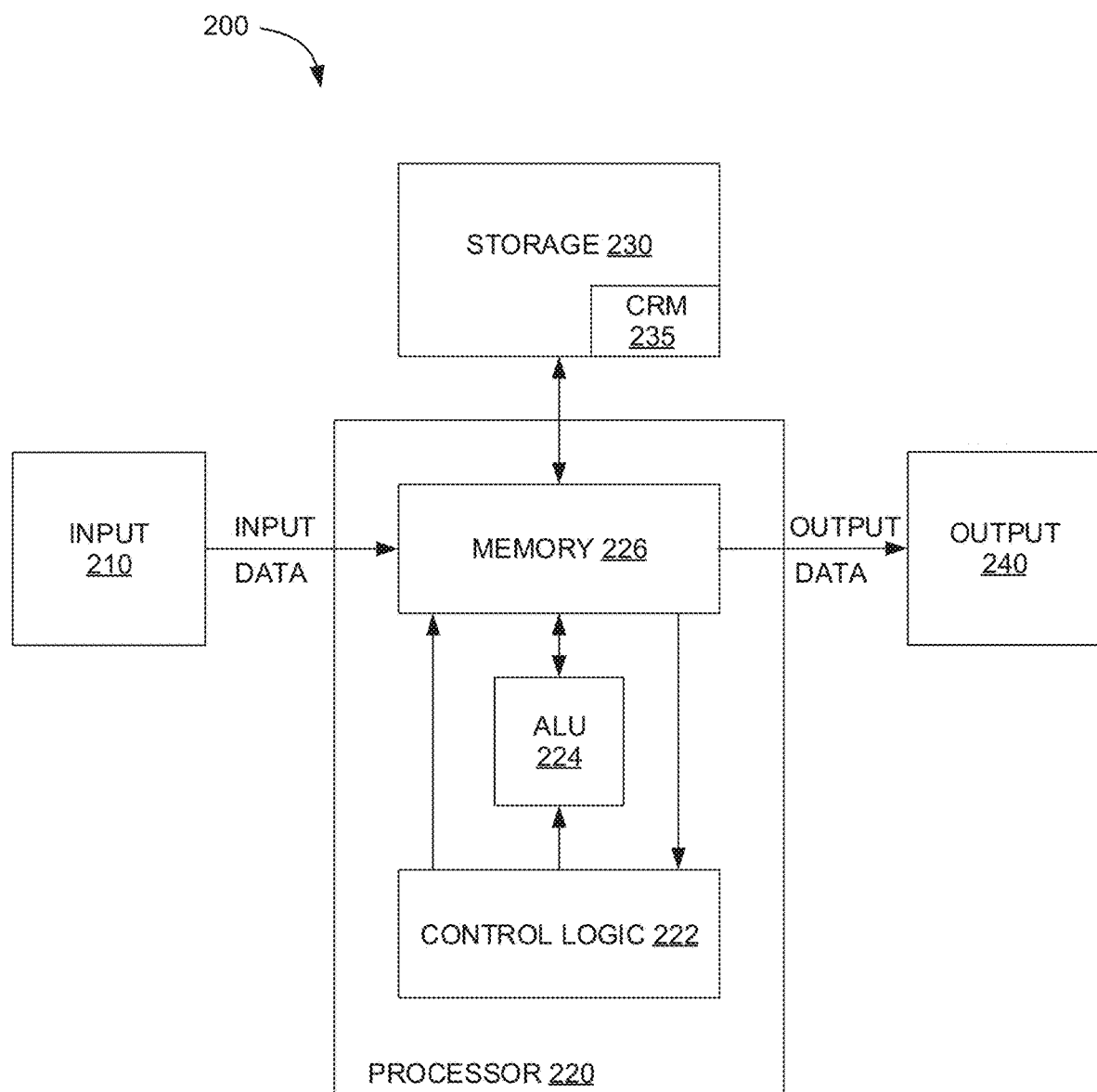
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220, which is sometimes also referred to as host processor 220, to provide input data. If desired, memory 226 of processor 220 may store the input data. Processor 220 is coupled with output device 240. In some implementations, memory 226 may provide output data to output device 240.

Processor 220 further includes control logic 222 and arithmetic and logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM 235), such as used for storing computer programs. The storage device 230 is sometimes also referred to as host memory.

Figure 3:
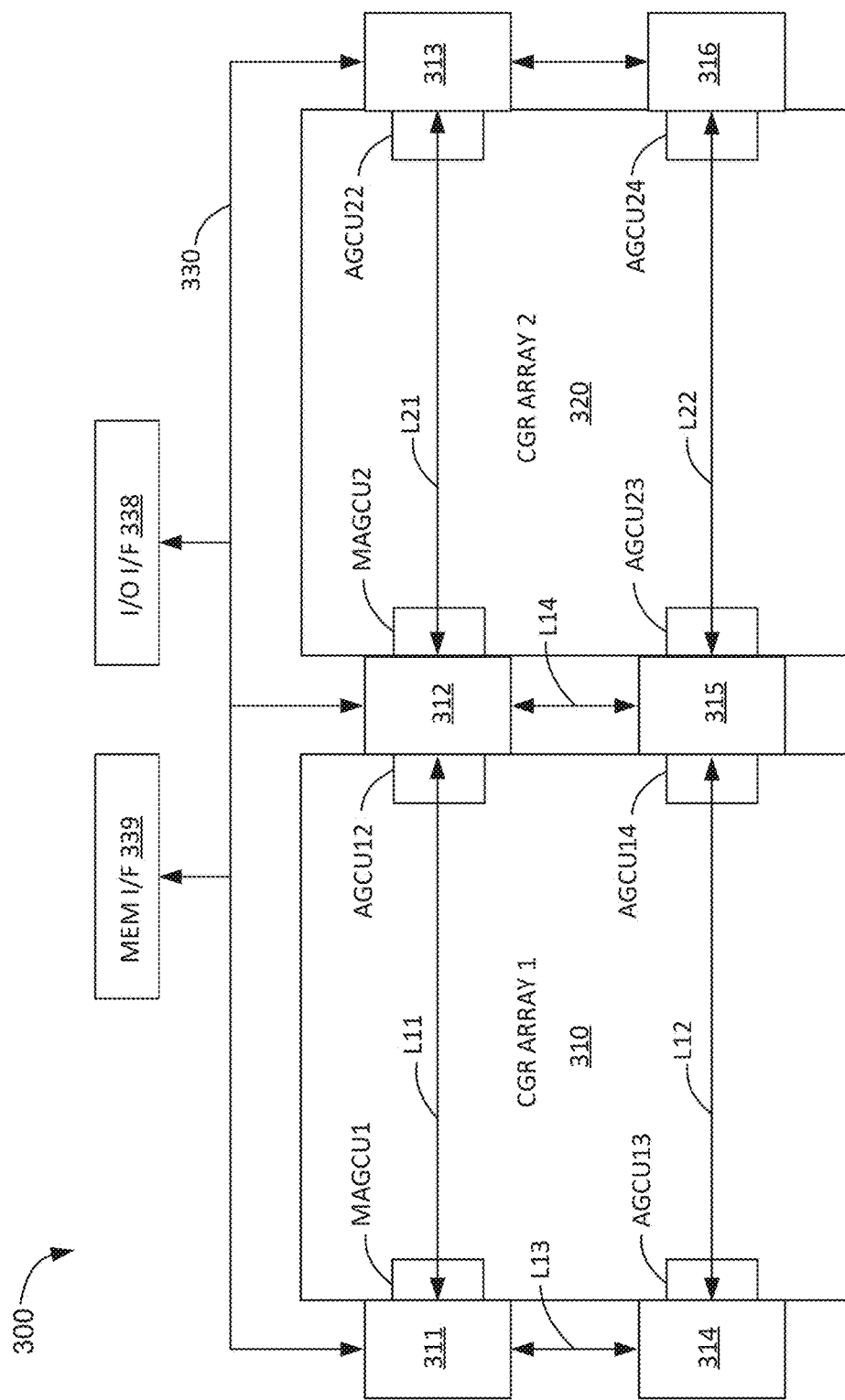
FIG. 3 is a diagram of an illustrative reconfigurable processor including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
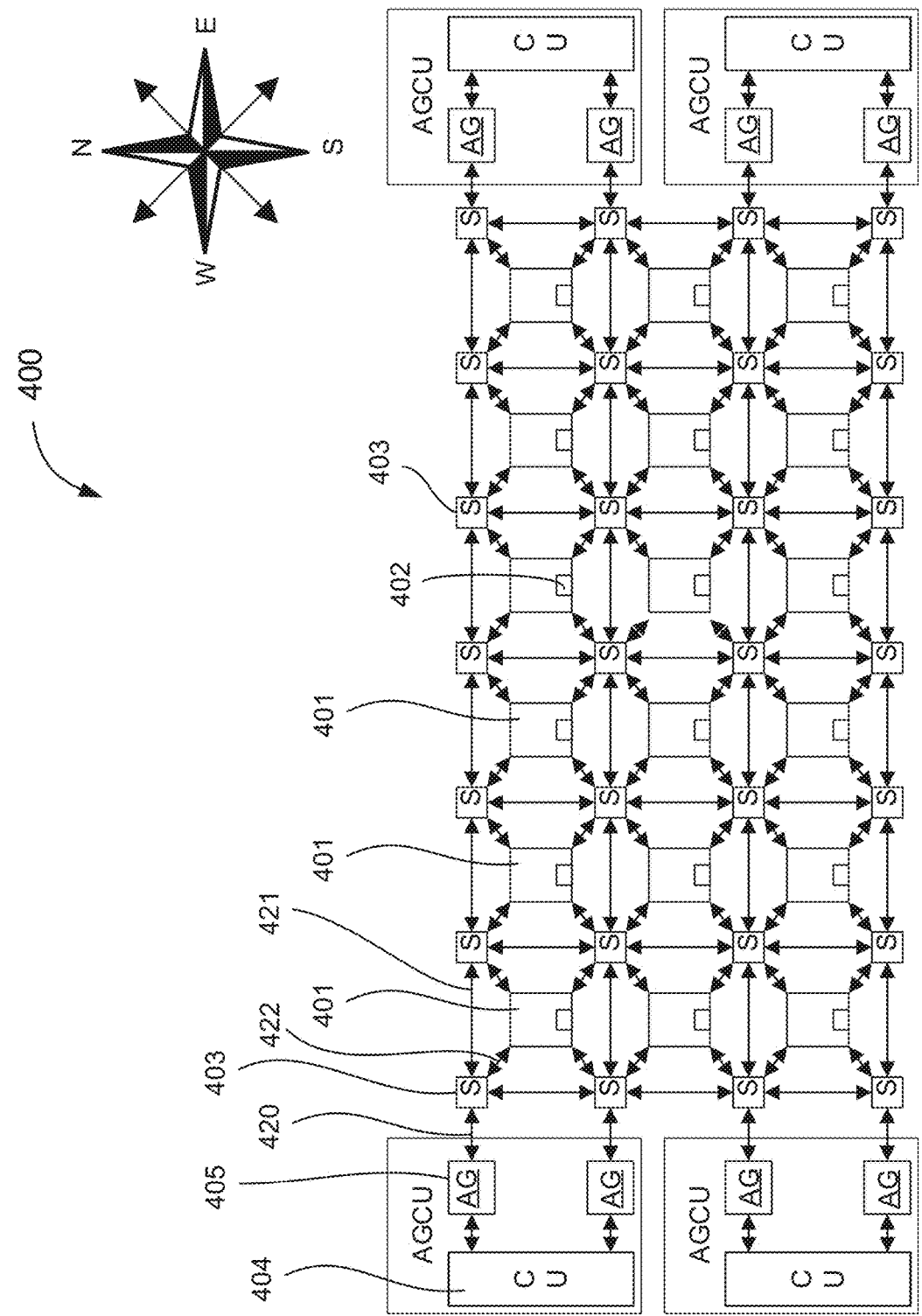
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada.

Illustratively, each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., the portions of host processor 180 of FIG. 1 that execute runtime processes, which is sometimes also referred to as "runtime logic") may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance 401 using one of the interconnects 422. Two switch units 403 in each CGR array quadrant have links to an AGCU using interconnects 420. The coalescing unit 404 of the AGCU arbitrates between the AGs 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more links 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
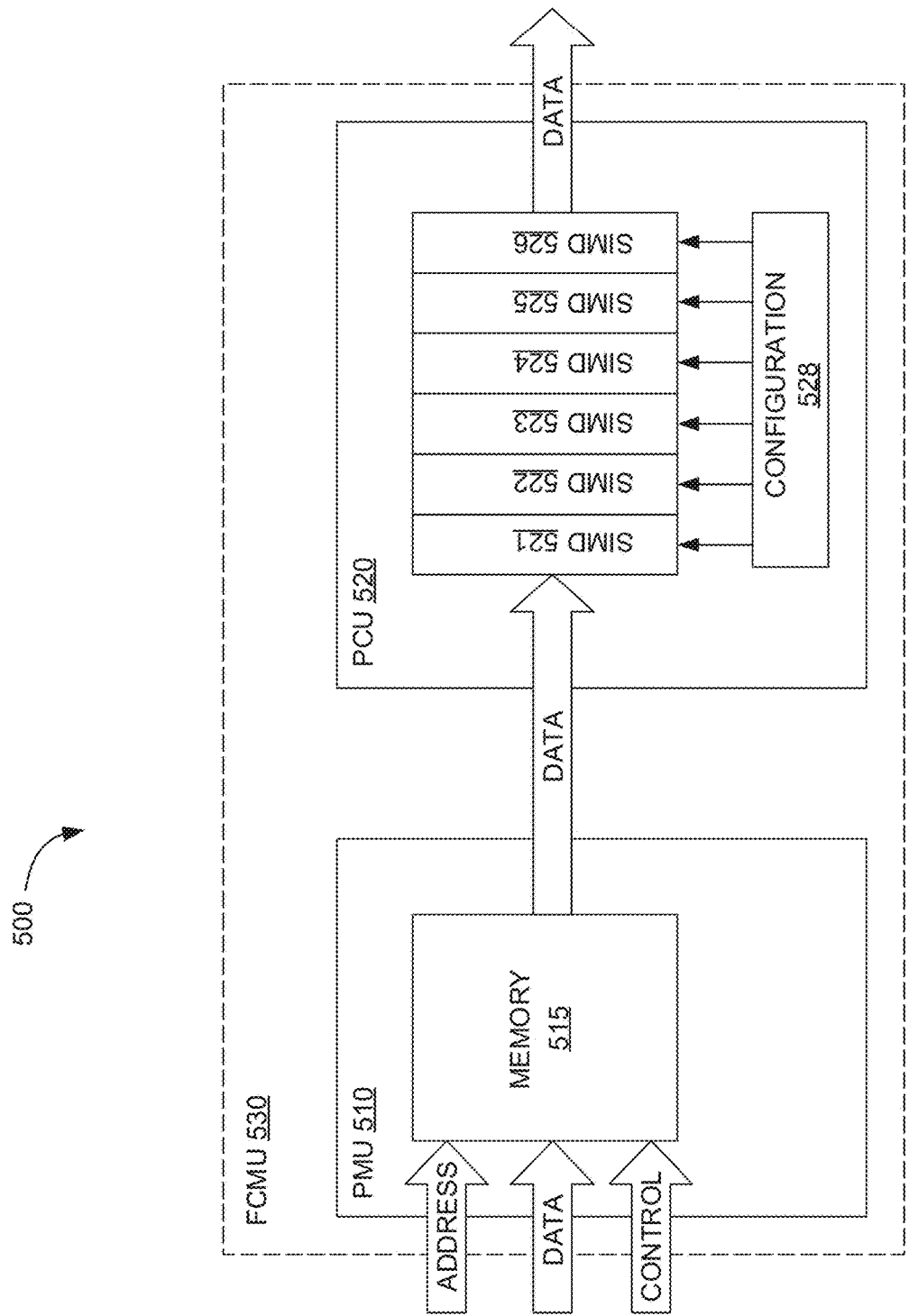
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (e.g., write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
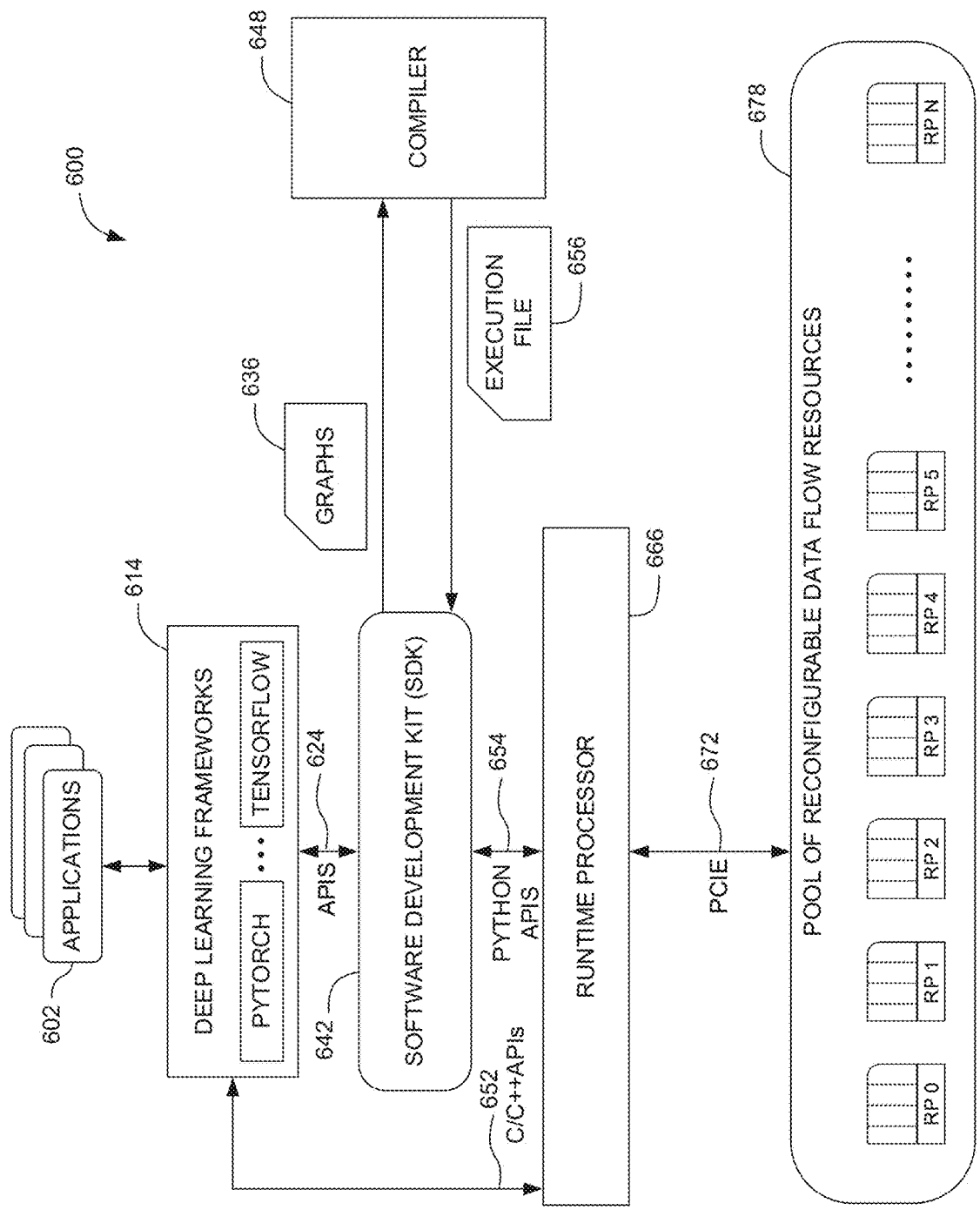
FIG. 6 is a diagram of an illustrative compute environment in which applications are provided a unified interface to a pool of reconfigurable data flow resources such that the pool of reconfigurable data flow resources is available to the applications as a single reconfigurable processor.

FIG. 6 shows a compute environment 600 that provides on-demand network access to a pool of reconfigurable data flow resources 678 that can be rapidly provisioned and released with minimal management effort or service provider interaction. The pool of reconfigurable data flow resources 678 includes CGR processor memory (e.g., attached CGR processor memory 190 of FIG. 1), arrays of CGR units, and busses (e.g., memory bus 195 of FIG. 1 and/or TLN 330 of FIG. 3) that couple the arrays of CGR units and the CGR processor memory.

The busses or transfer resources enable the arrays of CGR units to receive and send data. Examples of the busses include peripheral component interface express (PCIe) channels, direct memory access (DMA) channels, double data-rate (DDR) channels, Ethernet channels, and InfiniBand channels. In some implementations, the busses include at least one of a DMA channel, a DDR channel, a PCIe channel, an Ethernet channel, or an InfiniBand channel.

The arrays of CGR units (e.g., arrays of compute units and memory units) are arranged in one or more reconfigurable processors (e.g., CGR processor 110 of FIG. 1) and may be coupled with each other in a programmable interconnect fabric (e.g., ALN 120 of FIG. 1). In some implementations, the arrays of CGR units are aggregated as a uniform pool of resources that are assigned to the execution of user applications.

The CGR processor memory of the pool of reconfigurable data flow resources 678 may be usable by the arrays of CGR units to store data. Examples of the CGR processor memory include main memory (e.g., off-chip/external dynamic random-access memory (DRAM)) and/or local secondary storage (e.g., local disks (e.g., hard disk drive (HDD), solid-state drive (SSD))). The memory units of the arrays of CGR units may include PMUs, latches, registers, and/or caches (e.g., SRAM).

The pool of reconfigurable data flow resources 678 is dynamically scalable to meet the performance objectives of applications 602 (or user applications 602). In some implementations, the applications 602 access the pool of reconfigurable data flow resources 678 over one or more networks (e.g., Internet).

The pool of reconfigurable data flow resources 678 may have different compute scales and hierarchies according to different implementations of the technology disclosed.

In one example, the pool of reconfigurable data flow resources 678 is a node (or a single machine) with arrays of CGR units that are arranged in a plurality of reconfigurable processors, supported by bus and CGR processor memory. The node also includes a host processor (e.g., CPU) that exchanges data with the plurality of reconfigurable processors, for example, over a PCIe interface. The host processor includes a runtime processor that manages resource allocation, memory mapping, and execution of the configuration files for applications requesting execution from the host processor.

In another example, the pool of reconfigurable data flow resources 678 is a rack (or cluster) of nodes, such that each node in the rack runs a respective plurality of reconfigurable processors, and includes a respective host processor configured with a respective runtime processor. The runtime processors are distributed across the nodes and communicate with each other so that they have unified access to the reconfigurable processors attached not just to their own node on which they run, but also to the reconfigurable processors attached to every other node in the data center.

The nodes in the rack are connected, for example, over Ethernet or InfiniBand (IB). In yet another example, the pool of reconfigurable data flow resources 678 is a pod that comprises a plurality of racks. In yet another example, the pool of reconfigurable data flow resources 678 is a superpod that comprises a plurality of pods. In yet another example, the pool of reconfigurable data flow resources 678 is a zone that comprises a plurality of superpods. In yet another example, the pool of reconfigurable data flow resources 678 is a data center that comprises a plurality of zones.

Users may execute applications 602 on the compute environment 600. Therefore, applications 602 are sometimes also referred to as user applications. The applications 602 are executed on the pool of reconfigurable data flow resources 678 in a distributed fashion by programming the individual compute and memory components to asynchronously receive, process, and send data and control information.

In the pool of reconfigurable data flow resources 678, computation can be executed as deep, nested data flow pipelines that exploit nested parallelism and data locality very efficiently. These data flow pipelines contain several stages of computation, where each stage reads data from one or more input buffers with an irregular memory access pattern, performs computations on the data while using one or more internal buffers or scratchpad memory to store and retrieve intermediate results, and produce outputs that are written to one or more output buffers. The structure of these pipelines depends on the control and data flow graph representing the application. Pipelines can be arbitrarily nested and looped within each other.

The applications 602 comprise high-level programs. A high-level program may include source code written in programming languages like C, C++, Java, JavaScript, Python, and/or Spatial, for example, using deep learning frameworks 614 such as PyTorch, TensorFlow, ONNX, Caffe, and/or Keras. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and/or Transformer-XL.

Software development kit (SDK) 642 generates computation graphs (e.g., data flow graphs, control graphs) 636 of the high-level programs of the applications 602. The SDK 642 transforms the input behavioral description of the high-level programs into an intermediate representation such as the computation graphs 636. This may include code optimization steps like false data dependency elimination, dead-code elimination, and constant folding. The computation graphs 636 encode the data and control dependencies of the high-level programs.

The computation graphs 636 comprise nodes and edges. The nodes can represent compute operations and memory allocations. The edges can represent data flow and flow control. In some implementations, each loop in the high-level programs can be represented as a "controller" in the computation graphs 636. The computation graphs 636 support branches, loops, function calls, and other variations of control dependencies. In some implementations, after the computation graphs 636 are generated, additional analyses or optimizations focused on loop transformations can be performed, such as loop unrolling, loop pipelining, loop fission/fusion, and loop tiling.

The SDK 642 also supports programming the reconfigurable data flow resources in the pool of reconfigurable data flow resources 678 at multiple levels, for example, from the high-level deep learning frameworks 614 to C++ and assembly language. In some implementations, the SDK 642 allows programmers to develop code that runs directly on the reconfigurable data flow resources. In other implementations, the SDK 642 provides libraries that contain predefined functions like linear algebra operations, element-wise tensor operations, non-linearities, and reductions that are used for creating, executing, and profiling the computation graphs 636 on the reconfigurable data flow resources. The SDK 642 communicates with the deep learning frameworks 614 via Application Programming Interfaces (APIs) 624.

A compiler 648 transforms the computation graphs 636 into a hardware-specific configuration, which is specified in an execution file 656 generated by the compiler 648. In one implementation, the compiler 648 partitions the computation graphs 636 into memory allocations and execution fragments, and these partitions are specified in the execution file 656. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as intended by the program. Different ones of the execution fragments can contain different amounts of computation. Execution fragments can represent parallel patterns or portions of parallel patterns and are executable asynchronously.

In some implementations, the partitioning of the computation graphs 636 into the execution fragments includes treating calculations within at least one innermost loop of a nested loop of the computation graphs 636 as a separate execution fragment. In other implementations, the partitioning of the computation graphs 636 into the execution fragments includes treating calculations of an outer loop around the innermost loop of the computation graphs 636 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data used to implement the computation graphs 636, and these memory allocations are specified in the execution file 656. Memory allocations define the type and the number of hardware resources (functional units, storage, or connectivity components). Main memory (e.g., DRAM) is memory outside the reconfigurable processors for which the memory allocations can be made. Scratchpad memory (e.g., SRAM) is memory inside the reconfigurable processors for which the memory allocations can be made. Other memory types for which the memory allocations can be made for various access patterns and layouts include read-only lookup-tables (LUTs), fixed size queues (e.g., FIFOs), and register files.

The compiler 648 binds memory allocations to virtual memory units and binds execution fragments to virtual compute units, and these bindings are specified in the execution file 656. In some implementations, the compiler 648 partitions execution fragments into memory fragments and compute fragments, and these partitions are specified in the execution file 656.

The compiler 648 assigns the memory fragments to the virtual memory units and assigns the compute fragments to the virtual compute units, and these assignments are specified in the execution file 656. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 648 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file 656. The compiler 648 places the physical memory units and the physical compute units onto positions in the arrays of CGR units of the pool of reconfigurable data flow resources and routes data and control networks between the placed positions, and these placements and routes are specified in the execution file 656.

The compiler 648 may translate the applications 602 developed with commonly used open-source packages such as Keras and/or PyTorch into reconfigurable processor specifications. The compiler 648 generates the configuration files with configuration data for the placed positions and the routed data and control networks. In one implementation, this includes assigning coordinates and communication resources of the physical memory and compute units by placing and routing units onto the arrays of the CGR units while maximizing bandwidth and minimizing latency.

A runtime processor 666 (e.g., host processor 180 of FIG. 1 executing runtime processes) receives the execution file 656 from the SDK 642 and uses the execution file 656 for resource allocation, memory mapping, and execution of the configuration files for the applications 602 on the pool of reconfigurable data flow resources 678. The runtime processor 666 may communicate with the SDK 642 over APIs 654 (e.g., Python APIs). If desired, the runtime processor 666 can directly communicate with the deep learning frameworks 614 over APIs 652 (e.g., C/C++ APIs).

The runtime processor 666 may be operatively coupled to the pool of reconfigurable data flow resources 678 via a local bus 672. If desired, the local bus 672 may be a PCIe bus or any other local bus that enables the runtime processor 666 to exchange data with the pool of reconfigurable data flow resources 678.

The runtime processor 666 parses the execution file 656, which includes a plurality of configuration files. Configuration files in the plurality of configurations files include configurations of the virtual data flow resources that are used to execute the user applications 602. The runtime processor 666 allocates a subset of the arrays of CGR units in the pool of reconfigurable data flow resources 678 to the virtual data flow resources.

The runtime processor 666 then loads the configuration files for the applications 602 to the subset of the arrays of CGR units. In the scenario in which the execution file 656 includes two user applications 602 (e.g., a first and a second user application), the runtime processor 666 is configured to load a first configuration file for executing the first user application to a first subset of the arrays of CGR units in the pool of reconfigurable data flow resources 678, and to load a second configuration file for executing the second user application to a second subset of the arrays of CGR units in the pool of reconfigurable data flow resources 678. In some implementations, the CGR processor memory and the arrays of CGR units of the one or more reconfigurable processors in the pool of reconfigurable data flow resources 678 are aggregated as a uniform pool of resources that are assigned to the execution of the first and second user applications 602. The runtime processor 666 then starts execution of the user applications 602 on the subsets of the arrays of CGR units.

An application for the purposes of this description includes the configuration files for reconfigurable data flow resources in the pool of reconfigurable data flow resources 678 compiled to execute a mission function procedure or set of procedures such as inferencing or learning in an artificial intelligence or machine learning system. A virtual machine for the purposes of this description comprises a set of reconfigurable data flow resources (including arrays of CGR units in one or more reconfigurable processor, bus, and CGR processor memory) configured to support execution of an application in arrays of CGR units and associated bus and CGR processor memory in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the pool of reconfigurable data flow resources 678 that are also used in the application, and so the configuration files for the application include the configuration data for its corresponding virtual machine, and links the application to a particular set of CGR units in the arrays of CGR units and associated bus and CGR processor memory.

The runtime processor 666 implements an application in a virtual machine that is allocated a particular set of reconfigurable data flow resources. The virtual machine includes a particular set of CGR units, which can include some or all CGR units of a single reconfigurable processor or of multiple reconfigurable processors, along with associated bus and CGR processor memory (e.g., PCIe channels, DMA channels, DDR channels, DRAM memory).

The runtime processor 666 respects the topology information (e.g., topology information 704 of FIG. 7) in the execution file 656 when allocating CGR units to the virtual data flow resources requested in the execution file 656. For example, consider the scenario in which the reconfigurable processor has a non-uniform communication bandwidth in East/West directions versus North/South directions. In this scenario, a virtual tile geometry that requires, for example, two tiles arranged horizontally, may suffer in performance if mapped to a physical tile geometry in which two tiles are arranged vertically. In some implementations, the topology information may specify rectilinear tile geometries.

Figure 7:
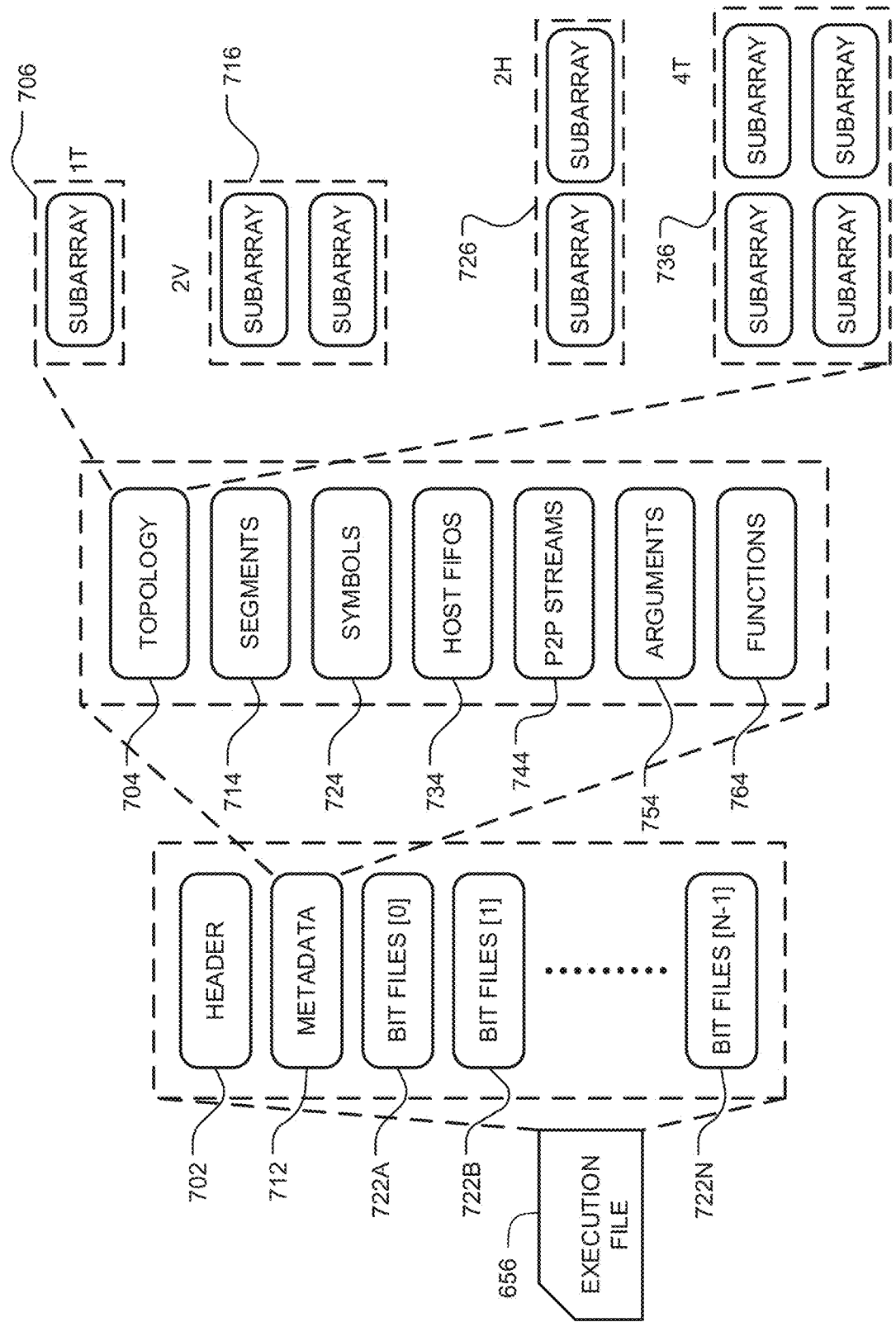
FIG. 7 is a diagram of an illustrative implementation of an execution file used by the technology disclosed to execute the applications on arrays of CGR units.

Turning to FIG. 7, the illustrative execution file 656 includes configuration files (e.g., configuration files 722*a*, 722*b*, . . . 722*n*). The configuration files are sometimes also referred to as bit files 722*a*, 722*b*, . . . 722*n* that implement the computation graphs 636 of the user applications 602 using the arrays of CGR units and the bus and CGR processor memory in the pool of reconfigurable data flow resources 678 of FIG. 6.

A program executable contains a bit-stream representing the initial configuration, or starting state, of each of the CGR units that execute the program. This bit-stream is referred to as a bit file, or hereinafter as a configuration file. The execution file 656 includes header 702 that indicates destinations on the reconfigurable processors for configuration data in the configuration files. In some implementations, a plurality of configuration files is generated for a single application.

The execution file 656 includes metadata 712 that accompanies the configuration files and specifies configurations of virtual data flow resources used to execute the applications 602. In one example, the execution file 656 can specify that a particular application uses an entire reconfigurable processor for execution, and as a result the metadata 712 identifies virtual data flow resources equaling at least the entire reconfigurable processor for loading and executing the configuration files for the particular application. In another example, the execution file 656 can specify that a particular application uses one or more portions of a reconfigurable processor for execution, and as a result the metadata 712 identifies virtual data flow resources equaling at least the one or more portions of the reconfigurable processor for loading and executing the configuration files for the particular application.

In yet another example, the execution file 656 can specify that a particular application uses an entire node for execution, and as a result the metadata 712 identifies virtual data flow resources equaling at least the entire node for loading and executing the configuration files for the particular application. In yet another example, the execution file 656 can specify that a particular application uses two or more nodes for execution, and as a result the metadata 712 identifies virtual data flow resources equaling at least the two or more nodes for loading and executing the configuration files for the particular application.

One skilled in the art would appreciate that the execution file 656 can similarly specify reconfigurable processors or portions thereof spanning across racks, pods, superpods, and zones in a data center, and as a result the metadata 712 identifies virtual data flow resources spanning across the racks, pods, superpods, and zones in the data center for loading and executing the configuration files for the particular application.

As part of the metadata 712, the execution file 656 includes topology information 704 that specifies orientation or shapes of portions of a reconfigurable processor for loading and executing the configuration files for a particular application.

In one implementation, a reconfigurable processor comprises a plurality of tiles of configurable units. Illustratively, a reconfigurable processor may include two tiles (e.g., the CGR architecture 300 of FIG. 3), each including a CGR array. If desired, a reconfigurable processor may include more than two tiles. For example, a reconfigurable processor may include four, eight, or sixteen tiles, or any other number of tiles that is not a power of two. The topology information 704 specifies an orientation of tiles in the plurality of tiles used to load and execute the configuration files for a particular application.

For example, when the particular application is allocated two tiles of the reconfigurable processor, the topology information 704 specifies whether the two tiles are arranged in a vertical orientation (2V) 716 or a horizontal orientation (2H) 726. If desired, the topology information 704 can allocate a single tile (1T) 706 of the reconfigurable processor to the particular application. In some implementations, the topology information 704 can allocate four tiles (4T) 736 of the reconfigurable processor to the particular application. In other implementations, other geometries may be specified, such as a group of three tiles.

The execution file 656 may specify virtual flow resources like PCIe channels, DMA channels, and DDR channels used to load and execute the configuration files for a particular application. The execution file 656 may specify virtual flow resources like main memory (e.g., off-chip/external DRAM), local secondary storage (e.g., local disks (e.g., HDD, SSD)), remote secondary storage (e.g., distributed file systems, web servers), latches, registers, and caches (e.g., SRAM) used to load and execute the configuration files for a particular application.

The execution file 656 may specify virtual memory segments 714 for the requested virtual flow resources, including virtual address spaces of the virtual memory segments and sizes of the virtual address spaces. The execution file 656 may specify symbols 724 (e.g., tensors, streams) used to load and execute the configuration files for a particular application. The execution file 656 may specify host FIFOs 734 accessed by the configuration files for a particular application during execution. The execution file 656 may specify peer-to-peer (P2P) streams 744 (e.g., data flow exchanges and control token exchanges between sources and sinks) exchanged between configurable units on which the configuration files for a particular application are loaded and executed. The execution file 656 may specify arguments 754 that modify execution logic of a particular application by supplying additional parameters or new parameter values to the configuration files for the particular application. The execution file 656 may specify functions 764 (e.g., data access functions like transpose, alignment, padding) to be performed by the configurable units on which the configuration files for a particular application are loaded and executed.

Figure 8:
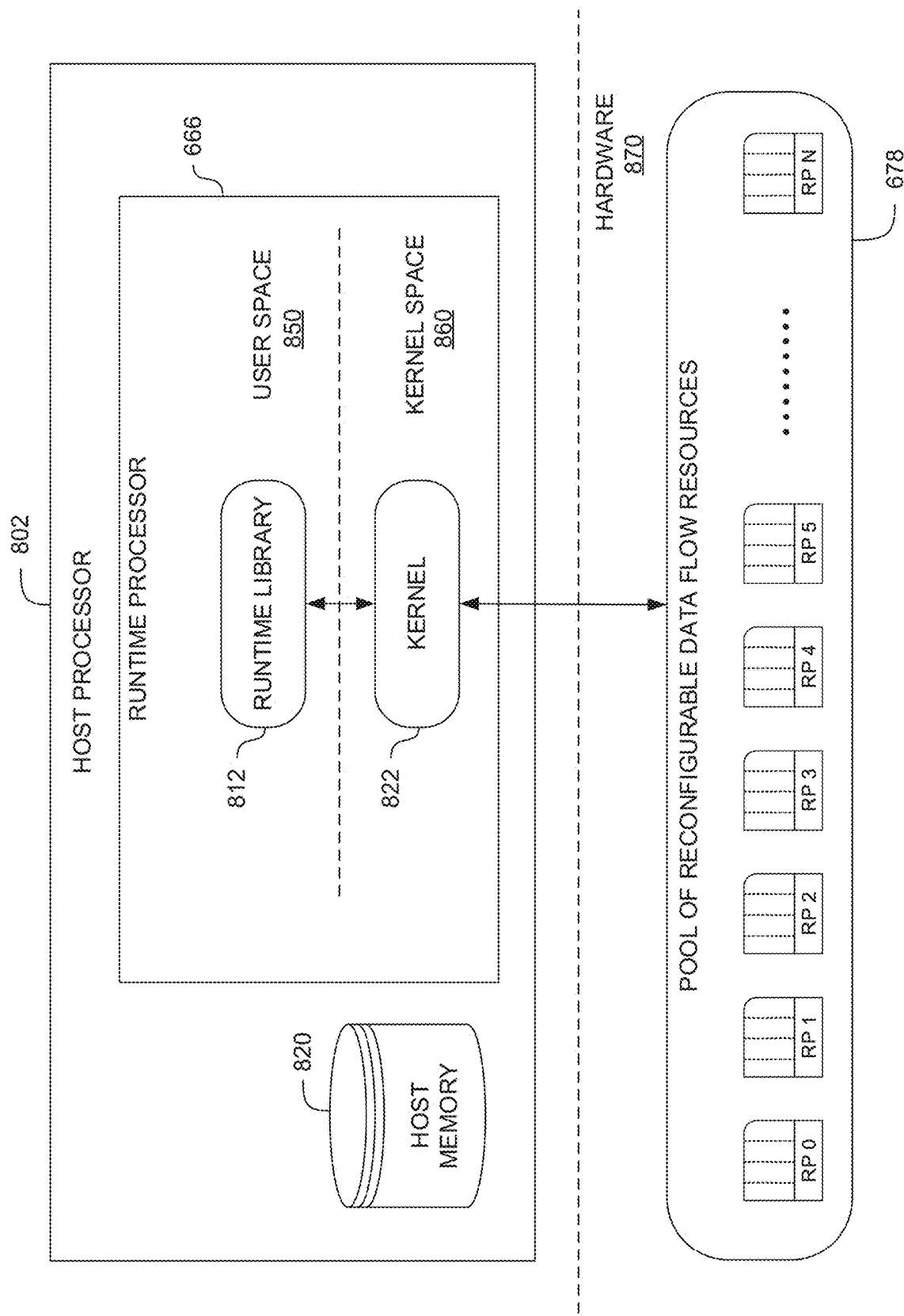
FIG. 8 is a diagram of an illustrative host processor that includes a runtime processor that is operatively coupled to the pool of reconfigurable data flow resources.

As illustratively shown in FIG. 8, the runtime processor 666 may be included in a host processor 802, which is operatively coupled to the pool of reconfigurable data flow resources 678 (e.g., via a PCIe interface). The host processor 802 runs the software components for user request, compute resource, and communication management. In one implementation, the host processor 802 uses a PCIe interface that manages reconfiguration of the CGR processor memory, the busses, and the arrays of CGR units in the pool of reconfigurable data flow resources 678 and movement of data into and out of the pool of reconfigurable data flow resources. A built-in arbiter guarantees fair communication bandwidth to every reconfigurable processor when multiple reconfigurable processors are communicating with the runtime processor 666.

The runtime processor 666 includes a runtime library 812 that runs in a user space 850 of the host processor 802. The runtime processor 666 includes a kernel module 822 that runs in a kernel space 860 of the host processor 802. The host processor 802 has host memory 820. If desired, the host memory 820 may be separate from the host processor 802, and a host may include the host processor 802 and the separate host memory 820.

In implementations disclosed herein, the runtime processor 666, based on virtual data flow resources requested in an execution file (e.g., execution file 656 of FIG. 6) for configuration files of a particular application (e.g., one of applications 602 of FIG. 6), allocates segments of the host memory 820 to a virtual machine that implements the particular application. In one implementation, the runtime processor 666 runs on top of Linux.

The runtime processor 666 partitions the physical hardware resources in the hardware space 870, i.e. the components in the pool of reconfigurable data flow resources, into multiple virtual resources, and provides uniform and coherent access to these virtual resources as being physical in a balanced and unified view. It also manages all interactions among the applications and their respective resources by handling the traffic of application requests for reconfigurable resources, memory, and I/O channels.

Figure 9:
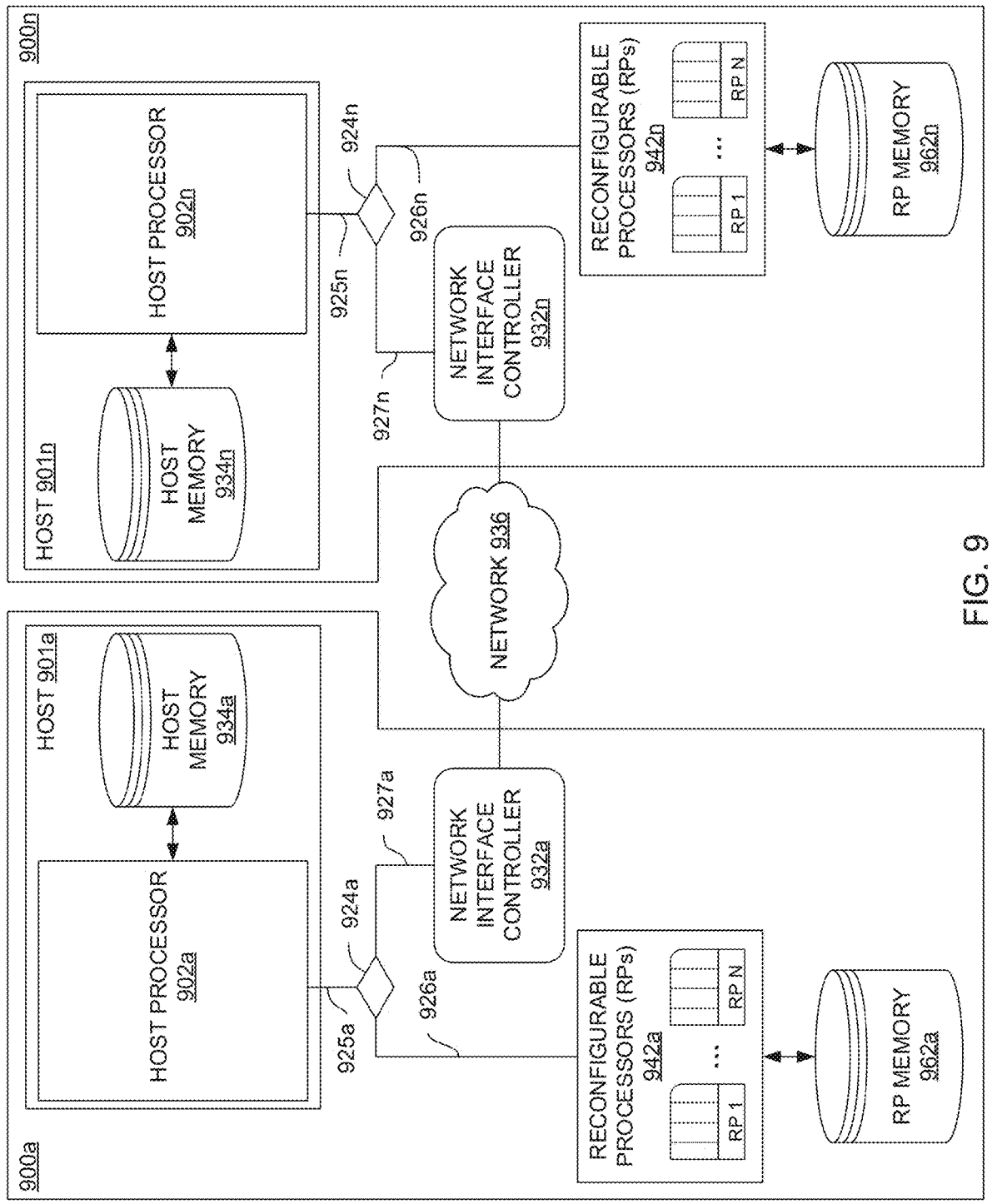
FIG. 9 is a diagram of an illustrative system including two data processing systems that are coupled by a network and configured for providing direct memory access to memory in the other data processing system.

FIG. 9 is a diagram of an illustrative system including first and second data processing systems 900a, 900n that are coupled by a network 936 (also called herein "network fabric").

Examples of the network 936 include a Storage Area Network (SAN), a Local Area Network (LAN), and a Wide Area Network (WAN). The SAN can be implemented with a variety of data communications fabrics, devices, and protocols. For example, the fabrics for the SAN can include Fibre Channel, Ethernet, InfiniBand™, Serial Attached Small Computer System Interface ('SAS'), or the like. Data communication protocols for use with the SAN can include Advanced Technology Attachment ('ATA'), Fibre Channel Protocol, Small Computer System Interface ('SCSI'), Internet Small Computer System Interface ('iSCSI'), Hyper-SCSI, Non-Volatile Memory Express ('NVMe') over Fabrics, or the like.

The LAN can also be implemented with a variety of fabrics, devices, and protocols. For example, the fabrics for the LAN can include Ethernet (e.g., 802.3), wireless (e.g., 802.11), or the like. Data communication protocols for use in the LAN can include Transmission Control Protocol ('TCP'), User Datagram Protocol ('UDP'), Internet Protocol (IP), Hypertext Transfer Protocol ('HTTP'), Wireless Access Protocol ('WAP'), Handheld Device Transport Protocol ('HDTP'), Session Initiation Protocol ('SIP'), Real-time Transport Protocol ('RTP'), or the like.

Illustratively, the first and/or the second data processing system 900a, 900n may be configured for providing direct memory access to memory in the other data processing system over the network 936.

The first data processing system 900a includes a first reconfigurable processor 942a with a first reconfigurable processor memory 962a, a first host 901a that is operatively coupled to the first reconfigurable processor, and a first network interface controller (NIC) 932a that is sometimes also referred to as a "network interface card" 932a.

The second data processing system 900n includes a second reconfigurable processor 942n with a second reconfigurable processor memory 962n, a second host 901n that is operatively coupled to the second reconfigurable processor, and a second network interface controller (NIC) 932n that is sometimes also referred to as a "network interface card" 932n.

Illustratively, the network 936 may connect NIC 932a with NIC 932n, thereby connecting the first host 901a and the first reconfigurable processor 942a with the second host 901n and the second reconfigurable processor 942n.

The first host 901a includes a first host processor 902a and a first host memory 934a that is coupled to the first host processor 902a. In some implementations, the first host memory may be included within the first host processor as illustratively shown in FIG. 8. The first network interface controller (NIC) 932a is operatively coupled to the first reconfigurable processor 942a and to the first host processor 902a.

The second host 901n includes a second host processor 902n and a second host memory 934n that is coupled to the second host processor 902n. In some implementations, the second host memory may be included within the second host processor as illustratively shown in FIG. 8. The second network interface controller (NIC) 932n is operatively coupled to the second reconfigurable processor 942n and to the second host processor 902n.

In implementations described herein, the first and second host processors 902a, 902n are coupled to a respective first local bus 925a, 925n, the first and second network interface controllers (NICs) 932a, 932n are coupled to a respective second local bus 927a, 927n, and the first and second reconfigurable processors 942a, 942n are coupled to a respective third local bus 926a, 926n.

A bus switch 924a in the first data processing system 900a may couple the local buses 925a, 926a, 927a, thereby coupling the first host processor 902a, the first reconfigurable processor 942a, and the first network interface controller 932a. Another bus switch 924n in the second data processing system 900n may couple the local buses 925n, 926n, 927n, thereby coupling the second host processor 902n, the second reconfigurable processor 942n, and the second network interface controller 932n.

The local buses 925a, 926a, 927a, 925n, 926n, 927n may include a Peripheral Component Interconnect Express (PCIe) bus, a Cache Coherent Interconnect for Accelerators (CCIX) protocol bus, a Compute Express Link (CXL) connection, and/or an Open Coherent Accelerator Processor Interface (OpenCAPI).

In some implementations, the first data processing system 900a and/or the second data processing system 900n may include more than one first reconfigurable processor 942a and/or more than one second reconfigurable processor 942n. For example, the first data processing system 900a may include M reconfigurable processors 942a, where M is an integer greater than one, and/or the second data processing system 900n may include N reconfigurable processors 942n, where N is an integer greater than one. In some implementations, the M reconfigurable processors 942a and/or the N reconfigurable processors 942n may be organized in a pool of reconfigurable data flow resources such as reconfigurable data flow resources 678 shown in FIG. 6 and FIG. 8.

By way of example, the first and/or second reconfigurable processors 942a, 942n are Coarse-Grained Reconfigurable Architecture (CGRA) devices. If desired, each reconfigurable processor 942a, 942n may include an array of configurable units (e.g., compute units and memory units) in a programmable interconnect fabric. The array of configurable units in the reconfigurable processor may be partitionable into a plurality of subarrays (or tiles) of configurable units. If desired, CGR processor 110 having arrays of CGR units 120 of FIG. 1 may implement the first and/or second reconfigurable processors 942a, 942n.

The first and/or second reconfigurable processor memory 962a, 962n may include main memory such as dynamic random-access memory (DRAM), flash memory, magnetic disks (e.g., hard disk drive (HDD)), solid-state drives (SSD), optical disks, and/or any other memory type known in the art.

The first and second reconfigurable processor 942a, 942n may interface with the first and second reconfigurable processor memory 962a, 962n, respectively (e.g., a memory interface such as memory interface 139 of FIG. 1 may couple the first reconfigurable processor 942a with the first reconfigurable processor memory 962a and another memory interface such as memory interface 139 of FIG. 1 may couple the second reconfigurable processor 942n with the second reconfigurable processor memory 952n).

In some implementations, each reconfigurable processor of the first and/or second reconfigurable processor 942a, 942n may interface with a respective separate reconfigurable processor memory 962a, 962n. If desired, the first and/or second reconfigurable processor memory 962a, 962n may be in the same package and/or on the same die as the associated first and/or second reconfigurable processor 942a, 942n. In other implementations, a single first reconfigurable processor memory 962a may be associated with the first reconfigurable processors 942a, and/or a single second reconfigurable processor memory 962n may be associated with the second reconfigurable processors 942n.

The second reconfigurable processor 942n of the second data processing system 900n may be configured to implement a virtual function, and the virtual function uses a virtual address for a memory access operation. Illustratively, the second host processor 902n is configured to implement an application programming interface (API) that translates the virtual address into a physical address. The second NIC 932n uses the physical address to initiate a direct memory access operation at the first reconfigurable processor memory 962a or the first host memory 934a that moves data directly between the second reconfigurable processor 942n and the first reconfigurable processor memory 962a or the first host memory 934a, whereby the data bypasses the second host 901n and is transferred directly between the second reconfigurable processor 942n and the second NIC 932n.

In some implementations, the arrays of CGR units of the second reconfigurable processor 942n may perform computational tasks in parallel to the sending and/or retrieving of the data.

In other implementations, the arrays of CGR units may stop the execution of a virtual function at a checkpoint and offload the current status of the arrays of CGR units of the second reconfigurable processors 942n that are involved in the execution of the virtual function.

Illustratively, the second NIC 932n may include a direct memory access controller that generates memory addresses for the direct memory access operation on the first reconfigurable processor memory 962a and/or the first host memory 934a and initiates memory read and/or write operations.

As an example, the direct memory access operation is a direct memory write access operation that moves the data directly from the second reconfigurable processor 942n over local bus 926n, bus switch 924n, local bus 927n, NIC 932n, network 936, NIC 932a, local bus 927a, bus switch 924a, local bus 926a to the reconfigurable processor memory 962a. As another example, the direct memory access operation is a direct memory write access operation that moves the data directly from the second reconfigurable processor 942n over local bus 926n, bus switch 924n, local bus 927n, NIC 932n, network 936, NIC 932a, local bus 927a, bus switch 924a, local bus 925a to the host memory 934a.

As yet another example, the direct memory access operation is a direct memory read access operation that moves the data directly from the reconfigurable processor memory 962a via local bus 926a, bus switch 924a, local bus 927a, NIC 932a, network 936, NIC 932, local bus 927, bus switch 924, and local bus 926 to the second reconfigurable processor 942a. As yet another example, the direct memory access operation is a direct memory read access operation that moves the data directly from the host memory 934a via local bus 925a, bus switch 924a, local bus 927a, NIC 932a, network 936, NIC 932, local bus 927, bus switch 924, and local bus 926 to the second reconfigurable processor 942a.

If desired, the first reconfigurable processor 942a of the first data processing system 900a may be configured to implement another virtual function, and the other virtual function uses another virtual address for another memory access operation. Illustratively, the first host processor 902a is configured to implement another application programming interface (API) that translates the other virtual address into another physical address. The first NIC 932a uses the other physical address to initiate another direct memory access operation at the second reconfigurable processor memory 962n or the second host memory 934n that moves data directly between the first reconfigurable processor 942a and the second reconfigurable processor memory 962n or the second host memory 934n, wherein the data bypasses the first host 901a and is transferred directly between the first reconfigurable processor 942a and the first NIC 932a. If desired, the virtual function that the second data processing system 900n implements and the other virtual function that the first data processing system 900a implements may execute simultaneously.

Figure 10:
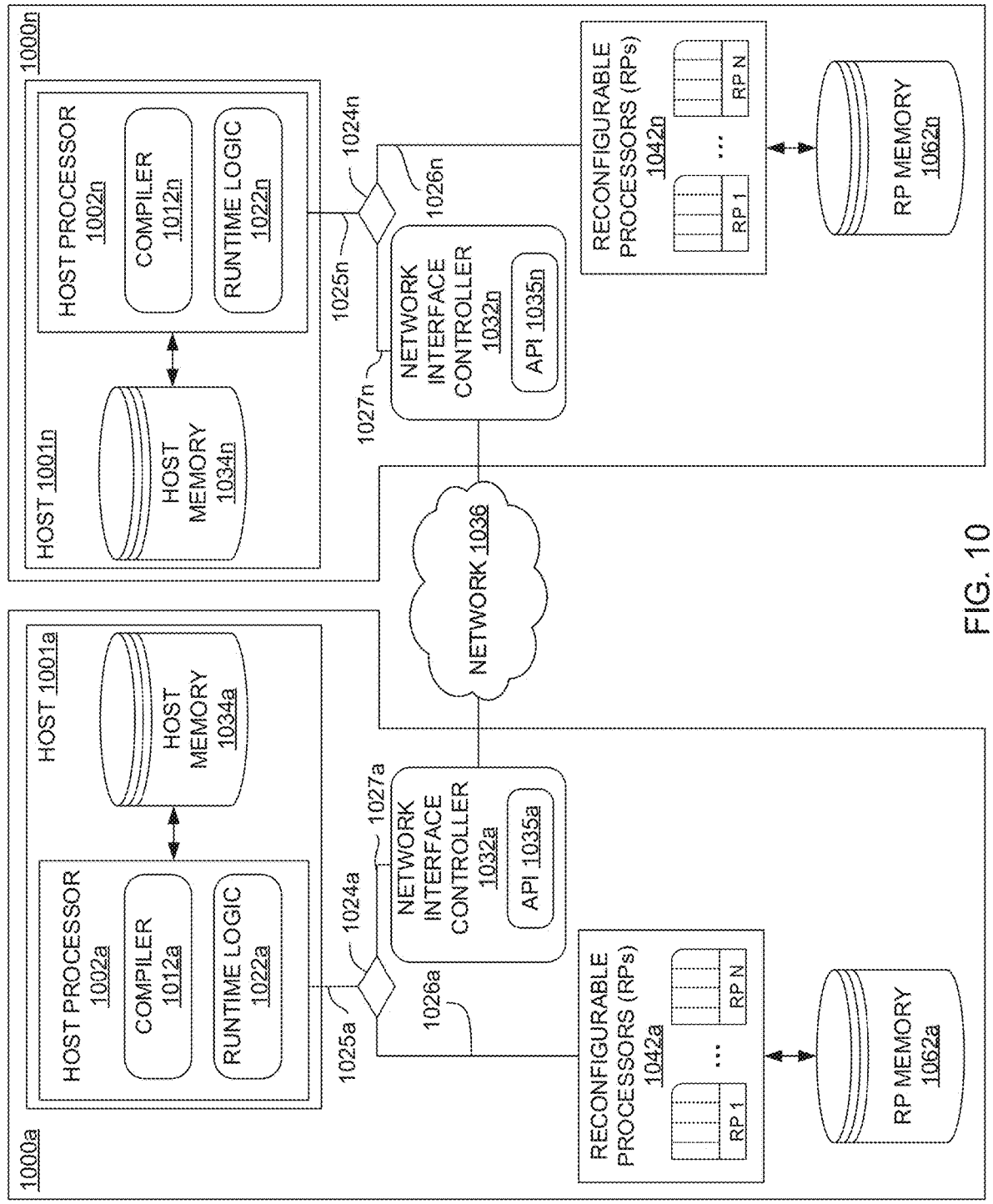
FIG. 10 is a diagram of an illustrative system with two data processing systems that are coupled by a network and that both include a network interface controller (NIC) that includes an application programming interface (API) for performing direct memory access operations.

FIG. 10 is a diagram of an illustrative system with two data processing systems 1000a, 1000n that are coupled by a network 1036 and that both include a network interface controller (NIC) 1032a, 1032n that includes an application programming interface (API) 1035a, 1035n for performing direct memory access operations.

As shown in FIG. 10, each data processing system 1000a, 1000n may include reconfigurable processors 1042a, 1042n with reconfigurable processor memories 1062a, 1062n and hosts 1001a, 1001n with respective host processors 1002a, 1002n and associated host memories 1034a, 1034n. Respective bus switches 1024a, 1024n may couple respective local busses 1025a, 1026a, 1027a and 1025n, 1026n, 1027n, thereby operatively coupling the respective reconfigurable processors 1042a, 1042n, the respective host processors 1002a, 1002n, and the respective NICs 1032a, 1032n.

Thus, the API 1035a that is associated with NIC 1032a may enable the transfer of data between the reconfigurable processors 1042a and the host memory 1034n or the reconfigurable processor memory 1062n. If desired, the API 1035a may include a direct memory access controller. Similarly, the API 1035n that is associated with NIC 1032n may enable the transfer of data between the reconfigurable processors 1042n and the host memory 1034a or the reconfigurable processor memory 1062a. If desired, the API 1035n may include a direct memory access controller.

Illustratively, the host processors 1002a, 1002n may both include a compiler 1012a, 1012n. The compiler 1012a, 1012n may receive applications and generate for the applications a configuration file that is adapted to be executed on the respective reconfigurable processors 1042a, 1042n. As shown in FIG. 10, the illustrative host processors 1002a, 1002n may each include runtime logic 1022a, 1022n. The runtime logic 1022a, 1022n may be configured to provide on-demand access to the respective reconfigurable processors 1042a, 1042n, for example to execute the compiled applications on the respective reconfigurable processors 1042a, 1042n.

In some implementations, the runtime logic 1022a, 1022n may configure the respective reconfigurable processors 1042a, 1042n to implement a respective virtual function. The respective virtual function may use a virtual address for a memory access operation. The respective host processor 1002a, 1002n is configured to implement an application programming interface (API) (e.g., in runtime logic 1022a, 1022n) that translates the virtual address into a physical address. The translation between a virtual address and a physical address is sometimes also referred to as "address mapping" or "address unmapping" or just "mapping" or "unmapping".

The NIC 1032*a*, 1032*n*, and more particularly the API 1035*a*, 1035*n* in the NIC 1032*a*, 1032*n* uses the physical address to initiate a direct memory access operation at the respective other data processing system 1000*n*, 1000*a*. The direct memory access operation moves data directly between the reconfigurable processors 1042*a* and the reconfigurable processor memory 1062*n* or the host memory 1034*n* or between the reconfigurable processors 1042*n* and the reconfigurable processor memory 1062*a* or the host memory 1034*a*, whereby the data bypasses the respective host processor 1002*a*, 1002*n* and is transferred directly between the respective reconfigurable processors 1042*a*, 1042*n* and the respective NICs 1032*a*, 1032*n*.

The direct memory access operation may be a direct memory write access operation that moves the data directly from the reconfigurable processors 1042*a* to the host memory 1034*n* or to the reconfigurable processor memory 1062*n* or from the reconfigurable processors 1042*n* to the host memory 1034*a* or to the reconfigurable processor memory 1062*a*.

If desired, the direct memory access operation may be a direct memory read access operation that moves the data directly from the host memory 1034*n* or the reconfigurable processor memory 1062*n* to the reconfigurable processors 1042*a* or from the host memory 1034*a* or the reconfigurable processor memory 1062*a* to the reconfigurable processors 1042*n*.

Illustratively, at least some API 1035*a*, 1035*n* (e.g., for initiating the direct memory access operation) may be located in the respective NIC 1032*a*, 1032*n*.

As an example, consider the scenario in which the local buses 1025*a*, 1026*a*, and 1027*a* are PCIe buses. In this scenario, the runtime logic 1022*a* may memory map the PCIe physical base address register region into its virtual address space to create the virtual to physical address mapping, and a storage kernel module may call into the API, which may calculate the physical address by adding the offset of the virtual address from the start of the virtual memory region to the start of the base address physical address. The NIC 1032*a* may perform a direct memory access (DMA) operation at the host memory 1034*n* or the reconfigurable processor memory 1062*n* by acting as a peer PCIe device of the reconfigurable processors 1042*a* to form a peer-to-peer (P2P) DMA operation. In the scenario in which the reconfigurable processor memory 1062*a* is connected to the memory controllers of the reconfigurable processors 1042*a* and over a PCIe fabric to the network interface controller 1032*a*, and the reconfigurable processor memory 1062*n* is connected to the memory controllers of the reconfigurable processors 1042*n* and over a PCIe fabric to the network interface controller 1032*n*, a direct access from the DMA engine in the network interface controller 1032*a* to the reconfigurable processor memory 1062*n* may transfer data from the reconfigurable processor memory 1062*n* via the network 1036 to the network interface controller 1032*a* and over the PCIe bus to the reconfigurable processors 1042*a* and the reconfigurable processor memory 1062*a*.

As another example, consider the scenario in which the local buses 1025*n*, 1026*n*, and 1027*n* are PCIe buses. In this scenario, the runtime logic 1022*n* may memory map the PCIe physical base address register region into its virtual address space to create the virtual to physical address mapping, and a storage kernel module may call into the API, which may calculate the physical address by adding the offset of the virtual address from the start of the virtual memory region to the start of the base address physical address. The NIC 1032*n* may perform a direct memory access (DMA) operation at the host memory 1034*a* or the reconfigurable processor memory 1062*a* by acting as a peer PCIe device of the reconfigurable processors 1042*n* to form a peer-to-peer (P2P) DMA operation. In the scenario in which the reconfigurable processor memory 1062*a* is connected to the memory controllers of the reconfigurable processors 1042*a* and over a PCIe fabric to the network interface controller 1032*a*, and the reconfigurable processor memory 1062*n* is connected to the memory controllers of the reconfigurable processors 1042*n* and over a PCIe fabric to the network interface controller 1032*n*, a direct access from the DMA engine in the network interface controller 1032*n* to the reconfigurable processor memory 1062*a* may transfer data from the reconfigurable processor memory 1062*a* via the network 1036 to the network interface controller 1032*n* and over the PCIe bus to the reconfigurable processors 1042*n* and the reconfigurable processor memory 1062*n*.

In some implementations, runtime logic 1022*a*, 1022*n* may be divided into a user space and a kernel space. The kernel space may include components such as a device driver, a resource manager, a scheduler, just to name a few.

Figure 11:
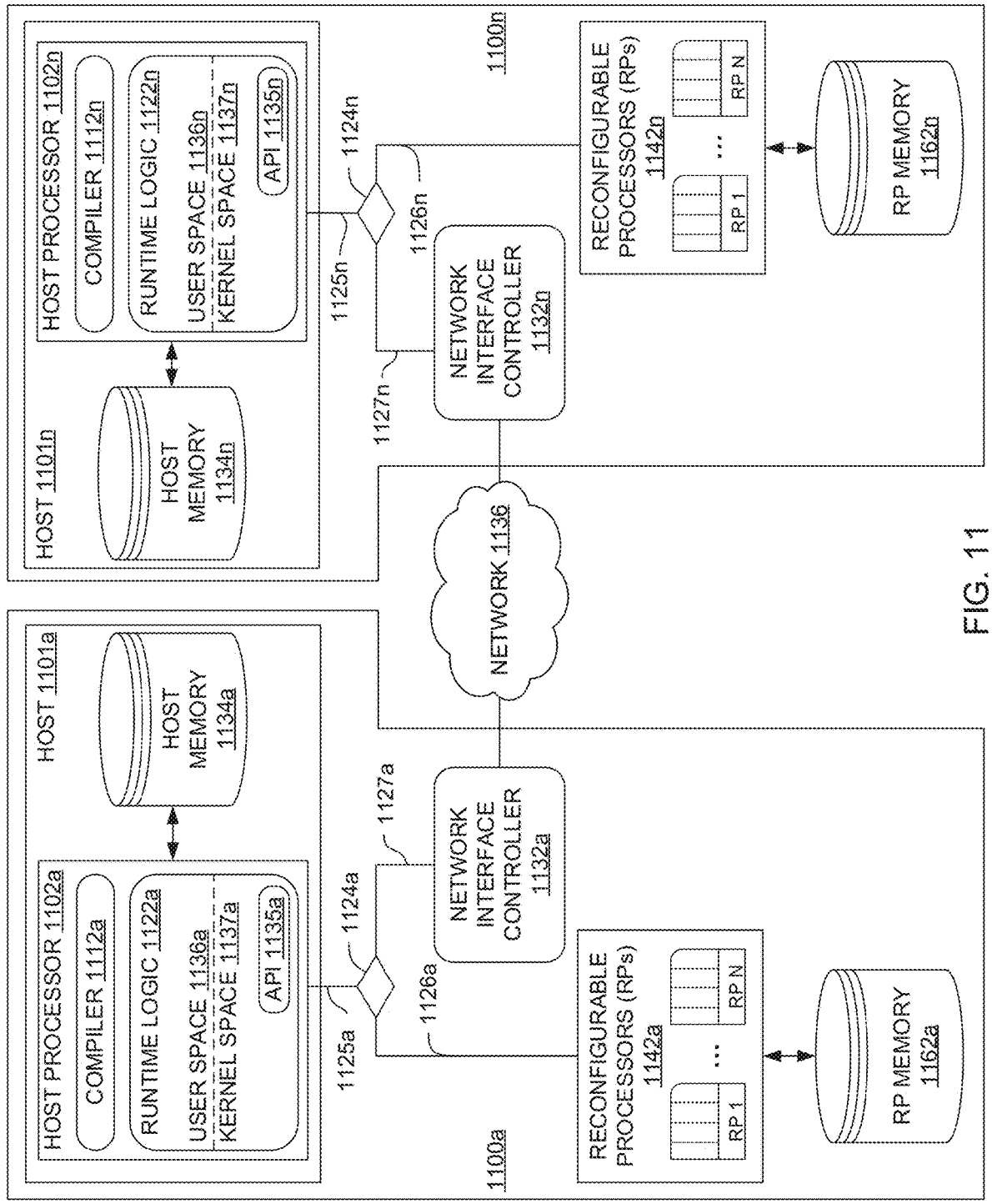
FIG. 11 is a diagram of an illustrative system with two data processing systems that are coupled by a network and that both include an application programming interface (API) that is located in a kernel space of runtime logic.

FIG. 11 is a diagram of an illustrative system with two data processing systems 1100*a*, 1100*n* that are coupled by a network 1136 and that each have runtime logic 1122*a*, 1122*n* in a host processor 1102*a*, 1102*n* that may be divided into a user space 1136*a*, 1136*n* and a kernel space 1137*a*, 1137*n*.

As shown in FIG. 11, each data processing system 1100*a*, 1100*n* may include network interface controllers (NICs) 1132*a*, 1132*n*, reconfigurable processors 1142*a*, 1142*n* with reconfigurable processor memories 1162*a*, 1162*n* and hosts 1101*a*, 1101*n* with respective host processors 1102*a*, 1102*n* and associated host memories 1134*a*, 1134*n*. Respective bus switches 1124*a*, 1124*n* may couple respective local busses 1125*a*, 1126*a*, 1127*a* and 1125*n*, 1126*n*, 1127*n*, thereby operatively coupling the respective reconfigurable processors 1142*a*, 1142*n*, the respective host processors 1102*a*, 1102*n*, and the respective NICs 1132*a*, 1132*n*.

Illustratively, the host processors 1102*a*, 1102*n* may both include a compiler 1112*a*, 1112*n*. The compiler 1112*a*, 1112*n* may receive applications and generate for the applications a configuration file that is adapted to be executed on the respective reconfigurable processors 1142*a*, 1142*n*. As shown in FIG. 11, the illustrative host processors 1102*a*, 1102*n* may each include runtime logic 1122*a*, 1122*n* with a user space 1136*a*, 1136*n* and a kernel space 1137*a*, 1137*n*. The runtime logic 1122*a*, 1122*n* may be configured to provide on-demand access to the respective reconfigurable processors 1142*a*, 1142*n*, for example to execute the compiled applications on the respective reconfigurable processors 1142*a*, 1142*n*.

In some implementations, the runtime logic 1122*a*, 1122*n* may configure the respective reconfigurable processors 1142*a*, 1142*n* to implement a respective virtual function. The respective virtual function may use a virtual address for a memory access operation. The respective host processor 1102*a*, 1102*n* is configured to implement a respective application programming interface (API) 1135*a*, 1135*n* in the respective kernel space 1137*a*, 1137*n* of the respective runtime logic 1122*a*, 1122*n*. The API 1135*a*, 1135*n* translates the virtual address into a physical address. The translation between a virtual address and a physical address is sometimes also referred to as "address mapping" or "address unmapping" or just "mapping" or "unmapping".

If desired, the file system's kernel module, which collectively are hereinafter also referred to as "storage kernel modules", may be located in the kernel space 1137a, 1137n of the runtime logic 1122a, 1122n. A read or write operation of a reconfigurable processor 1142a, 1142n from or to the host memory 1134n, 1134a or the reconfigurable processor memory 1162n, 1162a in the other data processing system 1100n, 1100a with a virtual address is handed off to the corresponding storage kernel module that needs to translate the virtual address to a physical address for the direct memory access (DMA) operation.

The storage kernel modules may invoke the virtual to physical address mapping API 1135a, 1135n to get the virtual to physical address translation. Illustratively, the virtual to physical address translation may be organized as follows: When an application (e.g., a graph) starts execution on the reconfigurable processors 1142n, the graph calls into the kernel space 1137n to memory map the PCIe physical base address register (BAR) region into its virtual address space and creates the virtual to physical mapping. When the storage kernel module calls into the map API 1135n, the physical address of an associated virtual address is calculated by adding the offset of the virtual address from the start of the virtual memory region to the start of the BAR physical address.

Illustratively, the API 1135a, 1135n that translates the virtual address into the physical address may include first and second arguments. The first argument of the API may include a list. The list may be both, input and output parameter. If desired, each element in the list includes a virtual address page. The second argument of the API may include a number of elements in the list. If desired, a third argument may be an output parameter which is set to a first value when the direct memory access operation targets the reconfigurable processor memory 1162n, 1162a in the respective other data processing system 1100n, 1100a and that is set to a second value that is different than the first value when the direct memory access operation targets the first host memory 1134n, 1134a in the respective other data processing system 1100n, 1100a.

Figure 12:
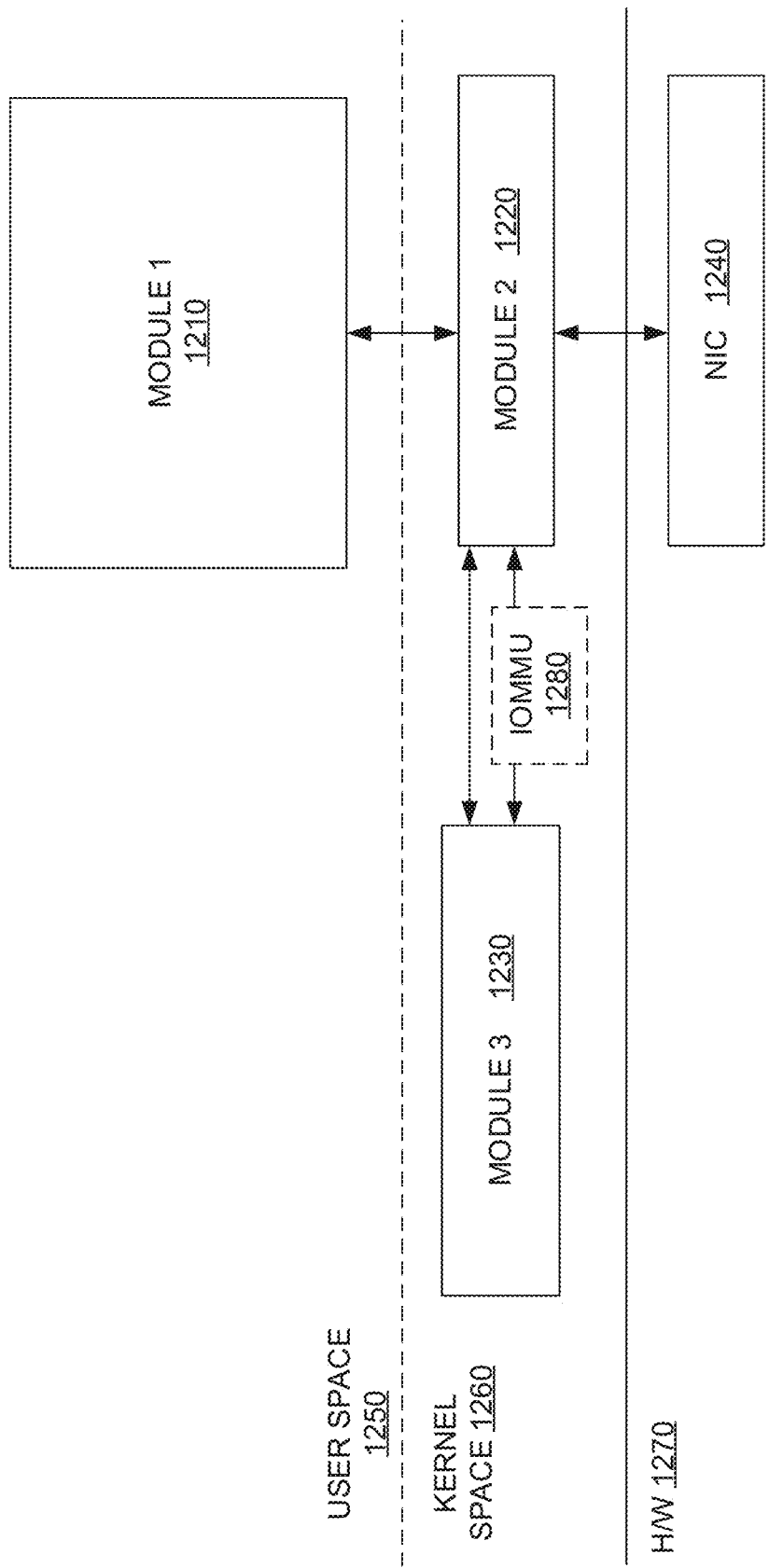
FIG. 12 is a diagram of illustrative runtime logic that implements three modules for translating a virtual address into a physical address.

FIG. 12 is a diagram of illustrative runtime logic with an API that implements three modules 1210, 1220, 1230 for translating a virtual address into a physical address. A first module (module 1) 1210 may be located in the user space 1250 of the runtime logic. A second module (module 2) 1220 and a third module (module 3) 1230 may be located in the kernel space 1260 of the runtime logic.

To simplify the discussion and avoid an unnecessary obfuscation of the present application, FIG. 12 is described hereinafter with reference to the data processing system 1100a of FIG. 11. However, the modules of FIG. 12 may instead or in addition be in the data processing system 1100n of FIG. 11.

Consider the scenario in which data from the network is to be written into an address that belongs to the host memory (e.g., host memory 1134a of FIG. 11) or to the reconfigurable processor memory (e.g., RP memory 1162a of FIG. 11) over the NIC 1240 and the network (e.g., network 1136 of FIG. 11). In this scenario, the network interface card (NIC) 1240 in the hardware space 1270 needs a physical address.

If that physical address resides on host memory (e.g., host memory 1134a of FIG. 11), the corresponding data is written into host memory, and if that physical address resides on reconfigurable processor memory (e.g., RP memory 1162a of FIG. 11), the corresponding data is written into reconfigurable processor memory. However, the software stack works based on virtual addresses. Therefore, module 1 1210 in the user space 1250 may receive a virtual address, pass the virtual address to module 2 1220 in the kernel space 1260, and module 2 1220 may translate the virtual address to a physical address. The translation by module 1 1210 and module 2 1220 succeeds when the direct memory access operation targets the host memory.

In the scenario in which the direct memory access operation targets the reconfigurable processor memory, module 2 1220 may not find the virtual address in the host memory (e.g., host memory 1134a of FIG. 11). Therefore, module 2 1220 may request the physical address (e.g., a PCIe physical address) from module 3 1230 in the kernel space 1260. The NIC 1240 may use the physical address from module 3 1230 to copy the data to the reconfigurable processor memory (e.g., RP memory 1162a of FIG. 11). If desired, module 3 1230 may interact with any NIC 1240. In other words, module 3 1230 may support multiple different NICs through a versatile mapping procedure.

Illustratively, module 3 1230 may calculate the physical address by adding the offset of the virtual address from the start of the BAR physical address and return the physical address in each scatter gather element of the list described above.

Illustratively, the reconfigurable processor may support a fixed-sized memory-mapped region. If desired, the fixed-sized memory-mapped region may be implemented in the PCIe BAR2 region, that exposes a "window" to the reconfigurable processor memory (e.g., reconfigurable processor memory 1162a of FIG. 11). This window is virtually contiguous. However, in the backend, the window may be implemented using a list of physically discontiguous regions ("window entries") of a well-defined "page-size" using a "page-table" like interface.

By way of example, a table manager may minimize the number of page-table entries reprogrammed during the execution of an application using a stateful Least Recently Used (LRU) cache and allowing overlapping page offset to be served by the same window entry.

Alternatively, after a system boot, the system initialization service may be able to dynamically discover the PCIe BAR2 size and use the PCIe BAR2 size to flexibly control window size and page-size in the table manager and support larger contiguous window entries, allowing for minimizing the number of contiguous data transfer operations.

However, in a non-trusted environment, exposing the reconfigurable processor memory (e.g., reconfigurable processor memory 1162a) via its PCIe BAR2 memory-mapped region directly to any third-party remote direct memory access (RDMA) devices for performing a remote read/write operation can represent a security risk. With I/O Memory Management Unit (IOMMU) 1280 support, the application reserves the control to register/unregister only the trusted RDMA device(s) with its allocated reconfigurable processor(s) PCIe BAR2 memory-mapped region, by programming the IOMMU page-tables 1280 with an additional level of translation between I/O Virtual Address (IOVA) to Physical PCIe Address (PA). Thereby, a user VA may be translated to an IOVA, while programming the RDMA devices. The IOMMU tables 1280 on the host processor (e.g., host processor 1102a of FIG. 11) will translate IOVA to PA before issuing a read or a write request to the reconfigurable processor memory locally or remotely.

Figure 13:
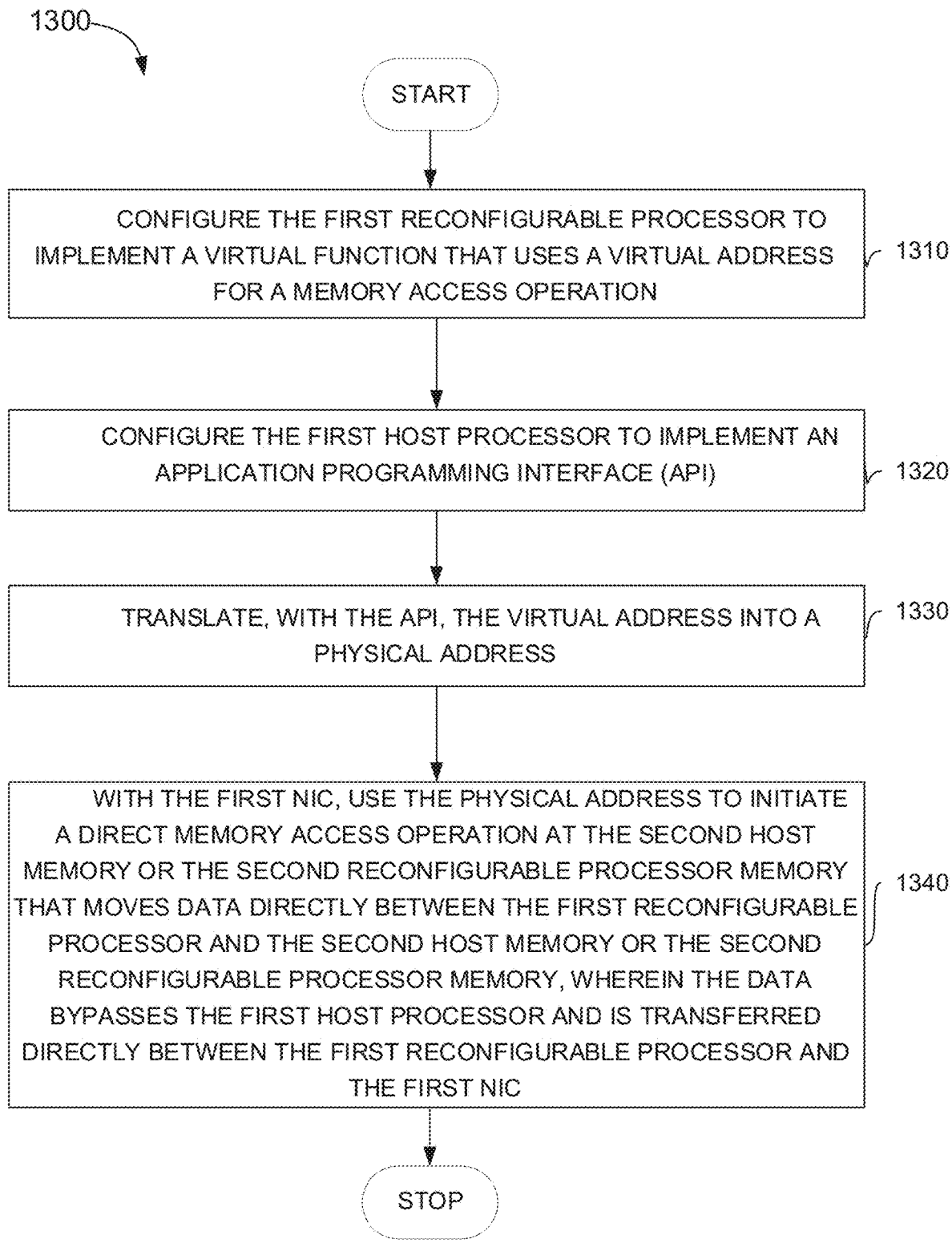
FIG. 13 is a flowchart showing illustrative operations that runtime logic may perform in a first data processing system for a direct memory access operation from a virtual function running on a reconfigurable processor of the first data processing system to host memory or reconfigurable processor memory of a second data processing system.

FIG. 13 is a flowchart 1300 showing illustrative operations that a first data processing system may perform for executing a direct memory access operation from a virtual function running on a reconfigurable processor of the first data processing system to host memory or reconfigurable processor memory of a second data processing system. As illustratively shown in FIG. 11, the first data processing system 1100*a* includes a first reconfigurable processor 1142*a* with a first reconfigurable processor memory 1162*a*, a first host 1101*a* that is operatively coupled to the first reconfigurable processor 1142*a* and includes a first host processor 1102*a*, and a first host memory 1134*a* that is coupled to the first host processor 1102*a*, and a first network interface controller (NIC) 1132*a* that is operatively coupled to the first reconfigurable processor 1142*a* and to the first host processor 1102*a*. As further illustratively shown in FIG. 11, the second data processing system 1100*n* is coupled via a network 1136 to the first data processing system 1100*a*. The second data processing system includes a second reconfigurable processor 1142*n* with a second reconfigurable processor memory 1162*n*, a second host 1101*n* that is operatively coupled to the second reconfigurable processor 1142*n* and includes a second host processor 1102*n*, and a second host memory 1134*n* that is coupled to the second host processor 1102*n*, and a second network interface controller (NIC) 1132*n* that is operatively coupled to the second reconfigurable processor 1142*n* and the second host processor 1102*n*.

During operation 1310, the runtime logic running on the first host processor of the first data processing system may configure the first reconfigurable processor to implement a virtual function that uses a virtual address for a memory access operation.

For example, runtime logic 1122*a* of FIG. 11 may configure the reconfigurable processors 1142*a* to implement a virtual function. The virtual function may use a virtual address for a memory access operation, if desired.

During operation 1320, the runtime logic may configure the first host processor to implement an application programming interface (API).

For example, runtime logic 1122*a* of FIG. 11 may configure the host processor 1102*a* to implement a memory mapping between virtual and physical addresses.

During operation 1330, the runtime logic may translate, with the API, the virtual address into a physical address.

During operation 1340, the runtime logic may direct the NIC to use the physical address to initiate a direct memory access operation at the second host memory or the second reconfigurable processor memory that moves data directly between the first reconfigurable processor and the second host memory or the second reconfigurable processor memory, wherein the data bypasses the first host processor and is transferred directly between the first reconfigurable processor and the first NIC.

For example, the runtime logic 1122*a* of FIG. 11 may invoke a direct memory access controller in the NIC 1132*a* such that the NIC 1132*a* uses the physical address to initiate a direct memory access operation at the host memory 1134*n* or the reconfigurable processor memory 1162*n* that moves data directly between the reconfigurable processor 1142*a* and the host memory 1134*n* or the reconfigurable processor memory 1162*n*, whereby the data bypasses the host processor 1102*a* and is transferred directly between the reconfigurable processors 1142*a* and the NIC 1032*a*.

In some implementations, the first host processor comprises runtime logic with a user space and a kernel space, and the API further comprises a first module that is located in the user space and second and third modules that are located in the kernel space. In these implementations, the runtime logic may translate, with the first and second modules, the virtual address into the physical address when the direct memory access operation targets the first host memory; and request, with the second module, the physical address from the third module when the direct memory access operation targets the first reconfigurable processor memory.

Illustratively, the API further comprises input/output memory management unit (IOMMU) page tables, and the runtime logic may translate, with the third module, the virtual address to an input/output virtual address (IOVA); and translate, with the IOMMU page tables, the IOVA to the physical address.

If desired, the direct memory access operation is one of a direct memory write access operation that moves the data directly from the first reconfigurable processor to the second host memory or the second reconfigurable processor memory or a direct memory read access operation that moves the data directly from the second host memory or the second reconfigurable processor memory to the first reconfigurable processor.

In some implementations, the first data processing system comprises a peripheral component interface express (PCIe) bus that couples the first host, the first reconfigurable processor, and the first NIC. In these implementations, translating, with the API, the virtual address into the physical address may include determining an offset of the virtual address from a start of an associated virtual memory region, and adding the offset to the start of the base address register's physical address.

Illustratively, translating, with the API, the virtual address into the physical address may further include receiving, with the API, a first argument that comprises a list, whereby each element in the list includes a virtual address page. Translating, with the API, the virtual address into the physical address may further include receiving, with the API, a second argument that comprises a number of elements in the list. If desired, the runtime logic may receive, with the API, a third argument that has a first value, if the virtual address belongs to the second host memory, and a second value that is different than the first value, if the virtual address belongs to the second reconfigurable processor memory.

If desired, a non-transitory computer-readable storage medium includes instructions that, when executed by a processing unit (e.g., host processor 1102*a* of FIG. 11), cause the processing unit to operate a system (e.g., the system including first and second data processing systems 1100*a*, 1100*n* of FIG. 11) by performing operation 1310 to 1340 of FIG. 13.

For example, a non-transitory computer-readable storage medium includes instructions that, when executed by a processing unit, cause the processing unit to operate a system that comprises a first data processing system comprising a first reconfigurable processor with a first reconfigurable processor memory, a first host that is operatively coupled to the first reconfigurable processor and comprising a first host processor, and a first host memory that is coupled to the first host processor, and a first network interface controller (NIC) that is operatively coupled to the first reconfigurable processor and to the first host processor; and a second data processing system that is coupled via a network to the first data processing system, comprising a second reconfigurable processor with a second reconfigurable processor memory, a second host that is operatively coupled to the second reconfigurable processor and comprising a second host processor, and a second host memory that is coupled to the second host processor, and a second network interface controller (NIC) that is operatively coupled to the second reconfigurable processor and the second host.

The instructions may include configuring the first reconfigurable processor to implement a virtual function that uses a virtual address for a memory access operation; translating the virtual address into a physical address; and initiating a direct memory access operation at the physical address of the second host memory or the second reconfigurable processor memory that moves data directly between the first reconfigurable processor and the second host memory or the second reconfigurable processor memory, wherein the data bypasses the first host processor and is transferred directly between the first reconfigurable processor and the first NIC.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms. Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a system, comprising: a first data processing system, comprising a first reconfigurable processor with a first reconfigurable processor memory, a first host that is operatively coupled to the first reconfigurable processor, comprising: a first host processor, and a first host memory that is coupled to the first host processor, and a first network interface controller (NIC) that is operatively coupled to the first reconfigurable processor and to the first host processor; and a second data processing system that is coupled via a network to the first data processing system, comprising: a second reconfigurable processor with a second reconfigurable processor memory, a second host that is operatively coupled to the second reconfigurable processor, comprising: a second host processor, and a second host memory that is coupled to the second host processor, and a second network interface controller (NIC) that is operatively coupled to the second reconfigurable processor and the second host processor, wherein the second reconfigurable processor is configured to implement a virtual function that uses a virtual address for a memory access operation, wherein the second host processor is configured to implement an application programming interface (API) that translates the virtual address into a physical address, and wherein the second NIC uses the physical address to initiate a direct memory access operation at the first reconfigurable processor memory or the first host memory that moves data directly between the second reconfigurable processor and the first reconfigurable processor memory or the first host memory, wherein the data bypasses the second host and is transferred directly between the second reconfigurable processor and the second NIC.

In Example 2, the first and second reconfigurable processors of Example 1 comprise arrays of coarse-grained reconfigurable (CGR) units.

In Example 3, the arrays of CGR units of the second reconfigurable processor of Example 2 perform computational tasks in parallel to the direct memory access operation.

In Example 4, the direct memory access operation of Example 1 is a direct memory write access operation that moves the data directly from the second reconfigurable processor to the first reconfigurable processor memory or the first host memory.

In Example 5, the direct memory access operation of Example 1 is a direct memory read access operation that moves the data directly from the first reconfigurable processor memory or the first host memory to the second reconfigurable processor.

In Example 6, the second host processor of Example 1 further comprises runtime logic with a user space and a kernel space, and wherein the API is located in the runtime logic.

In Example 7, the API of Example 6 further comprises a first module that is located in the user space; and a second module that is located in the kernel space, wherein the first and second modules translate the virtual address into the physical address when the direct memory access operation targets the first host memory.

In Example 8, the API of Example 7 further comprises a third module that is located in the kernel space, wherein the second module requests the physical address from the third module when the direct memory access operation targets the first reconfigurable processor memory.

In Example 9, the API of Example 8 further comprises input/output memory management unit (IOMMU) page tables, wherein the third module translates the virtual address to an input/output virtual address (IOVA), and wherein the IOMMU page tables translate the IOVA to the physical address.

In Example 10, the API of Example 1 that translates the virtual address into the physical address comprises a first argument that comprises a list, wherein each element in the list comprises a virtual address page; a second argument that comprises a number of elements in the list; and a third argument that is set to a first value when the direct memory access operation targets the first reconfigurable processor memory and to a second value that is different than the first value when the direct memory access operation targets the first host memory.

In Example 11, the second data processing system of Example 10 further comprises a peripheral component interconnect express (PCIe) bus, that couples the second reconfigurable processor, the second host, and the second NIC, wherein a PCIe physical base address register region is memory-mapped into a virtual address space to create a virtual to physical memory address mapping.

In Example 12, the second reconfigurable processor of Example 11 implements a fixed-sized memory-mapped region that exposes a virtually contiguous window to the second reconfigurable processor memory, and wherein the virtually contiguous window is implemented using a list of physically discontinuous regions.

Example 13 is a method of operating a system that comprises a first data processing system comprising a first reconfigurable processor with a first reconfigurable processor memory, a first host that is operatively coupled to the first reconfigurable processor and comprising a first host processor, and a first host memory that is coupled to the first host processor, and a first network interface controller (NIC) that is operatively coupled to the first reconfigurable processor and to the first host processor; and a second data processing system that is coupled via a network to the first data processing system, comprising a second reconfigurable processor with a second reconfigurable processor memory, a second host that is operatively coupled to the second reconfigurable processor and comprising a second host processor, and a second host memory that is coupled to the second host processor, and a second network interface controller (NIC) that is operatively coupled to the second reconfigurable processor and the second host processor, the method comprising: configuring the first reconfigurable processor to implement a virtual function that uses a virtual address for a memory access operation; configuring the first host processor to implement an application programming interface (API); translating, with the API, the virtual address into a physical address; and with the first NIC, using the physical address to initiate a direct memory access operation at the second host memory or the second reconfigurable processor memory that moves data directly between the first reconfigurable processor and the second host memory or the second reconfigurable processor memory, wherein the data bypasses the first host processor and is transferred directly between the first reconfigurable processor and the first NIC.

In Example 14, the first host processor of Example 13 comprises runtime logic with a user space and a kernel space, and the API further comprises a first module that is located in the user space and second and third modules that are located in the kernel space, the method further comprising: translating, with the first and second modules, the virtual address into the physical address when the direct memory access operation targets the first host memory; and requesting, with the second module, the physical address from the third module when the direct memory access operation targets the first reconfigurable processor memory.

In Example 15, the API of Example 14 further comprises input/output memory management unit (IOMMU) page tables, the method further comprising: translating, with the third module, the virtual address to an input/output virtual address (IOVA); and translating, with the IOMMU page tables, the IOVA to the physical address.

In Example 16, the direct memory access operation of Example 13 is one of a direct memory write access operation that moves the data directly from the first reconfigurable processor to the second host memory or the second reconfigurable processor memory or a direct memory read access operation that moves the data directly from the second host memory or the second reconfigurable processor memory to the first reconfigurable processor.

In Example 17, the first data processing system of Example 13 comprises a peripheral component interface express (PCIe) bus that couples the first host, the first reconfigurable processor, and the first NIC, and wherein translating, with the API, the virtual address into the physical address further comprises: determining an offset of the virtual address from a start of an associated virtual memory region; and adding the offset to the start of the base address register's physical address.

In Example 18, translating, with the API, the virtual address into the physical address of Example 17 further comprises: receiving, with the API, a first argument that comprises a list, wherein each element in the list comprises a virtual address page; and receiving, with the API, a second argument that comprises a number of elements in the list.

In Example 19, the operations of Example 17 further comprise: receiving, with the API, a third argument that has a first value, if the virtual address belongs to the second host memory, and a second value that is different than the first value, if the virtual address belongs to the second reconfigurable processor memory.

Example 20 is a non-transitory computer-readable storage medium including instructions that, when executed by a processing unit, cause the processing unit to operate a system that comprises a first data processing system comprising a first reconfigurable processor with a first reconfigurable processor memory, a first host that is operatively coupled to the first reconfigurable processor and comprising a first host processor, and a first host memory that is coupled to the first host processor, and a first network interface controller (NIC) that is operatively coupled to the first reconfigurable processor and to the first host processor; and a second data processing system that is coupled via a network to the first data processing system, comprising a second reconfigurable processor with a second reconfigurable processor memory, a second host that is operatively coupled to the second reconfigurable processor and comprising a second host processor, and a second host memory that is coupled to the second host processor, and a second network interface controller (NIC) that is operatively coupled to the second reconfigurable processor and the second host processor, the instructions comprising: configuring the first reconfigurable processor to implement a virtual function that uses a virtual address for a memory access operation; translating the virtual address into a physical address; and initiating a direct memory access operation at the physical address of the second host memory or the second reconfigurable processor memory that moves data directly between the first reconfigurable processor and the second host memory or the second reconfigurable processor memory, wherein the data bypasses the first host processor and is transferred directly between the first reconfigurable processor and the first NIC.

What is claimed is:

1. A system, comprising:
    a first data processing system, comprising:
        a first reconfigurable processor with a first reconfigurable processor memory,
        a first host that is operatively coupled to the first reconfigurable processor, comprising:
            a first host processor including runtime logic with a user space and a kernel space, and
            a first host memory that is coupled to the first host processor, and
        a first network interface controller (NIC) that is operatively coupled to, a network, the first reconfigurable processor, and the first host processor; and
    a second data processing system that is coupled via the network to the first data processing system, comprising:
        a second reconfigurable processor with a second reconfigurable processor memory,
        a second host that is operatively coupled to the second reconfigurable processor, comprising:
            a second host processor, and
            a second host memory that is coupled to the second host processor, and
        a second network interface controller (NIC) that is operatively coupled to the network, the second reconfigurable processor, and the second host processor;
    wherein the first reconfigurable processor is configured to implement a virtual function that uses a virtual address for a memory access operation ;
    wherein the first host processor is configured to implement an application programming interface (API) within the runtime logic that includes a first module located in the user space, a second module executing in kernel space, a third module executing in the kernel space, and input/output memory management unit (IOMMU) page tables;
    wherein the API translates the virtual address into a physical address using the first module and the second module for virtual addresses targeting the first host memory and additionally using the third module for virtual addresses targeting the first reconfigurable processor memory, wherein the third module translates the virtual address targeting the first reconfigurable processor memory to an input/output virtual address (IOVA), and then uses the IOMMU page tables to translate the IOVA to the physical address; and
    wherein the first NIC uses the physical address to initiate a direct memory access operation at the second reconfigurable processor memory or the second host memory that moves data directly between the first reconfigurable processor and the second reconfigurable processor memory or the second host memory, wherein the data bypasses the first host processor and is transferred directly between the first reconfigurable processor and the first NIC.

2. The system of claim 1, wherein the first and second reconfigurable processors comprise arrays of coarse-grained reconfigurable (CGR) units.

3. The system of claim 2, wherein the arrays of CGR units of the first reconfigurable processor perform computational tasks in parallel to the direct memory access operation.

4. The system of claim 1, wherein the direct memory access operation is a direct memory write access operation that moves the data directly from the first reconfigurable processor to the first-second reconfigurable processor memory or the second host memory.

5. The system of claim 1, wherein the direct memory access operation is a direct memory read access operation that moves the data directly from the second reconfigurable processor memory or the second host memory to the first reconfigurable processor.

6. The system of claim 1, wherein the API that translates the virtual address into the physical address comprises:
    a first argument that comprises a list, wherein each element in the list comprises a virtual address page;
    a second argument that comprises a number of elements in the list; and
    a third argument that is set to a first value when the direct memory access operation targets the second reconfigurable processor memory and to a second value that is different than the first value when the direct memory access operation targets the second host memory.

7. The system of claim 6, wherein the first data processing system further comprises:
a peripheral component interconnect express (PCIe) bus, that couples the first reconfigurable processor, the first host, and the first NIC, wherein a PCIe physical base address register region is memory-mapped into a virtual address space to create a virtual to physical memory address mapping.

8. The system of claim 7, wherein the first reconfigurable processor implements a fixed-sized memory-mapped region that exposes a virtually contiguous window to the first reconfigurable processor memory, and wherein the virtually contiguous window is implemented using a list of physically discontinuous regions.

9. A method of operating a system that comprises a first data processing system comprising a first reconfigurable processor with a first reconfigurable processor memory, a first host that is operatively coupled to the first reconfigurable processor and comprising a first host processor, and a first host memory that is coupled to the first host processor, and a first network interface controller (NIC) that is operatively coupled to a network, the first reconfigurable processor, and the first host processor; and a second data processing system that is coupled via the network to the first data processing system, comprising a second reconfigurable processor with a second reconfigurable processor memory, a second host that is operatively coupled to the second reconfigurable processor and comprising a second host processor, and a second host memory that is coupled to the second host processor, and a second network interface controller (NIC) that is operatively coupled to the network, the second reconfigurable processor, and the second host processor, the method comprising:
executing runtime logic on the first host processor with a user space and a kernel space;
configuring the first reconfigurable processor to implement a virtual function that uses a virtual address for a memory access operation;
configuring the first host processor to implement an application programming interface (API) within the runtime logic that includes a first module located in the user space, a second module executing in kernel space, a third module executing in the kernel space, and input/output memory management unit (IOMMU) page tables;
translating, with the API, the virtual address into a physical address using the first module and the second module for virtual addresses targeting the first host memory and additionally using the third module for virtual addresses targeting the first reconfigurable processor memory, wherein the third module translates the virtual address targeting the first reconfigurable processor memory to an input/output virtual address (IOVA), and then uses the IOMMU page tables to translate the IOVA to the physical address; and
with the first NIC, using the physical address to initiate a direct memory access operation at the second host memory or the second reconfigurable processor memory that moves data directly between the first reconfigurable processor and the second host memory or the second reconfigurable processor memory, wherein the data bypasses the first host processor and is transferred directly between the first reconfigurable processor and the first NIC.

10. The method of claim 9, wherein the direct memory access operation is one of a direct memory write access operation that moves the data directly from the first reconfigurable processor to the second host memory or the second reconfigurable processor memory or a direct memory read access operation that moves the data directly from the second host memory or the second reconfigurable processor memory to the first reconfigurable processor.

11. The method of claim 9, wherein the first data processing system comprises a peripheral component interface express (PCIe) bus that couples the first host, the first reconfigurable processor, and the first NIC, and wherein translating, with the API, the virtual address into the physical address further comprises:
determining an offset of the virtual address from a start of an associated virtual memory region; and
adding the offset to the start of a base address register's physical address.

12. The method of claim 11, wherein translating, with the API, the virtual address into the physical address further comprises:
receiving, with the API, a first argument that comprises a list, wherein each element in the list comprises a virtual address page; and
receiving, with the API, a second argument that comprises a number of elements in the list.

13. The method of claim 11, further comprising:
receiving, with the API, a third argument that has a first value, if the virtual address belongs to the second host memory, and a second value that is different than the first value, if the virtual address belongs to the second reconfigurable processor memory.

14. A non-transitory computer-readable storage medium including instructions that, when executed by a processing unit, cause the processing unit to operate a system that comprises a first data processing system comprising a first reconfigurable processor with a first reconfigurable processor memory, a first host that is operatively coupled to the first reconfigurable processor and comprising a first host processor, and a first host memory that is coupled to the first host processor, and a first network interface controller (NIC) that is operatively coupled to a network, the first reconfigurable processor, and the first host processor; and a second data processing system that is coupled via the network to the first data processing system, comprising a second reconfigurable processor with a second reconfigurable processor memory, a second host that is operatively coupled to the second reconfigurable processor and comprising a second host processor, and a second host memory that is coupled to the second host processor, and a second network interface controller (NIC) that is operatively coupled to the network, the second reconfigurable processor, and the second host processor, the instructions comprising:
executing runtime logic on the first host processor with a user space and a kernel space;
configuring the first reconfigurable processor to implement a virtual function that uses a virtual address for a memory access operation;
translating, with an application programming interface (API) within the runtime logic that includes a first module located in the user space, a second module executing in kernel space, a third module executing in the kernel space, and input/output memory management unit (IOMMU) page tables, the virtual address into a physical address using the first module and the second module for virtual addresses targeting the first host memory and additionally using the third module for virtual addresses targeting the first reconfigurable processor memory, wherein the third module translates the virtual address targeting the first reconfigurable processor memory to an input/output virtual address (IOVA), and then uses the IOMMU page tables to translate the IOVA to the physical address; and initiating, using the first NIC, a direct memory access operation at the physical address of the second host memory or the second reconfigurable processor memory that moves data directly between the first reconfigurable processor and the second host memory or the second reconfigurable processor memory, wherein the data bypasses the first host processor and is transferred directly between the first reconfigurable processor and the first NIC.

* * * * *